US011233597B2

(12) United States Patent
Agarwal et al.

(10) Patent No.: US 11,233,597 B2
(45) Date of Patent: Jan. 25, 2022

(54) SELECTIVE JAMMING DETECTION BASED ON COMPARING TWO OR MORE SIGNAL MEASUREMENT QUANTITIES

(71) Applicant: QUALCOMM Incorporated, San Diego, CA (US)

(72) Inventors: Ravi Agarwal, San Diego, CA (US); Huilin Xu, San Diego, CA (US); Gavin Bernard Horn, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/008,174

(22) Filed: Aug. 31, 2020

(65) Prior Publication Data

US 2021/0083794 A1 Mar. 18, 2021

Related U.S. Application Data

(60) Provisional application No. 62/901,154, filed on Sep. 16, 2019.

(51) Int. Cl.
*H04K 3/00* (2006.01)
*H04B 17/309* (2015.01)
*H04W 24/08* (2009.01)

(52) U.S. Cl.
CPC ........... *H04K 3/224* (2013.01); *H04B 17/309* (2015.01)

(58) Field of Classification Search
CPC ............ H04K 3/00; H04K 3/22; H04K 3/224; H04K 3/228; H04K 3/28; H04K 3/43;
(Continued)

(56) References Cited

U.S. PATENT DOCUMENTS 8,059,619 B2 * 11/2011 Jakobsen ............... H04W 24/08
455/67.13
9,031,538 B2 * 5/2015 Snider ................. H04W 12/122
455/569.2
(Continued)

FOREIGN PATENT DOCUMENTS

WO 2011075178 A1 6/2011
WO 2018029648 A1 2/2018

OTHER PUBLICATIONS

International Search Report and Written Opinion—PCT/US2020/049012—ISA/EPO—dated Dec. 14, 2020.12 pages.

*Primary Examiner* — Quochien B Vuong
(74) *Attorney, Agent, or Firm* — The Marbury Law Group, PLLC

(57) ABSTRACT

Methods implemented by a processor in a wireless device for detecting the presence in a network of a jammer or non-benign entity that targets physical layer channels in a communication network are disclosed. Various embodiments may determine a first signal measurement quantity based on a first physical layer communication, determine a second signal measurement quantity based on a second physical layer communication, determine a difference between the first signal measurement quantity and the second signal measurement quantity, determine whether the difference between the first signal measurement quantity and the second signal measurement quantity satisfies a threshold, determine whether a jammer or non-benign entity is present in the network in response to determining that the difference between the first signal measurement quantity and the second signal measurement quantity satisfies the threshold, and perform a mitigation operation in response to determining that a jammer or non-benign entity is present in the network.

15 Claims, 18 Drawing Sheets

(58) Field of Classification Search
CPC ............ H04K 3/45; H04K 1/02; H04K 3/222; H04K 3/40; H04K 3/46; H04K 3/65; H04K 3/822; H04K 3/825; H04K 2203/36; H04B 1/715; H04B 1/719; H04B 1/7097; H04B 7/0632; H04B 17/309; H04B 17/318; H04B 17/24; H04B 17/336; H04B 15/00; H04B 17/345; H04W 24/08; H04W 24/10; H04W 12/122; H04W 52/241; H04W 52/243; H04W 52/245; H04W 72/082; H04W 88/02

See application file for complete search history.

(56) References Cited

U.S. PATENT DOCUMENTS

| | | | |
|---|---|---|---|
| 9,048,993 B2 | 6/2015 | Khandekar et al. | |
| 9,166,730 B2 * | 10/2015 | Van Wiemeersch | H04K 3/22 |
| 9,844,016 B2 * | 12/2017 | Breuer | H04B 1/7097 |
| 10,263,726 B2 * | 4/2019 | Breuer | H04W 24/02 |
| 10,567,145 B2 | 2/2020 | Zhou et al. | |
| 10,666,338 B2 * | 5/2020 | Kim | H04B 7/0632 |

\* cited by examiner

SELECTIVE JAMMING DETECTION BASED ON COMPARING TWO OR MORE SIGNAL MEASUREMENT QUANTITIES

RELATED APPLICATIONS

This application claims the benefit of priority to U.S. Provisional Application No. 62/901,154, entitled "Selective Jamming Detection Based on Comparing Two Or More Signal Measurement Quantities" filed Sep. 16, 2019, the entire contents of which are hereby incorporated by reference for all purposes.

BACKGROUND

Long Term Evolution (LTE), 5G new radio (NR), and other recently developed communication technologies allow wireless devices to communicate information at data rates (e.g., in terms of Gigabits per second, etc.) that are orders of magnitude greater than what was available just a few years ago. Today's communication networks are also more secure, resilient to multipath fading, allow for lower network traffic latencies, and provide better communication efficiencies (e.g., in terms of bits per second per unit of bandwidth used, etc.). These and other recent improvements in communication technologies have facilitated the emergence of the Internet of Things (IOT), large scale Machine to Machine (M2M) communication systems, autonomous vehicles, and other technologies that rely on consistent and secure wireless communications. As a result, billions of small, mobile, or resource constrained computing devices (e.g., smartphones, watches, smart appliances, autonomous vehicles, etc.) now use Internet protocol (IP) and cellular communication networks to communicate critical and mundane information.

Concurrent with the above trends, software defined radio (SDR) chips and universal software radio peripheral (USRP) boards have become less expensive and are now widely available. Open source LTE/3G stacks (srsLTE, openLTE, OpenBTS-UMTS, etc.) allow programmers to quickly install and operate a base station via a laptop computer. These technologies have dramatically reduced the costs associated with setting up and operating a base station in a shell telecommunication network.

Due to these trends, wireless devices and cellular communication networks are increasingly vulnerable to the potential threat posed by fake base stations and jammers. Someone with malicious intent could set up a fake base station or jammer to deliberately transmit communication signals to jam or overwhelm the base stations of network service providers, launch denial of service attacks, drain the battery and processing resources of resource constrained computing devices (e.g., IOT devices, smartphones, etc.), or otherwise disrupt or hinder the services provided by legitimate communication networks and service providers.

SUMMARY

Various aspects include methods implemented by a processor in a wireless device for detecting the presence of a jammer or non-benign entity in a network that targets physical layer channels in a communication network.

Various aspects of the present disclosure include methods implemented by a processor in a wireless device for detecting the presence in a network of a jammer or non-benign entity that targets physical layer channels in a communication network. Various aspects may include determining a first signal measurement quantity based on a first physical layer communication, determining a second signal measurement quantity based on a second physical layer communication, determining a difference between the first signal measurement quantity and the second signal measurement quantity, determining whether the difference between the first signal measurement quantity and the second signal measurement quantity satisfies a threshold, determining whether a jammer or non-benign entity is present in the network in response to determining that the difference between the first signal measurement quantity and the second signal measurement quantity satisfies the threshold, and performing a mitigation operation in response to determining a jammer or non-benign entity is present in the network.

In some aspects, at least one of the first or second signal measurement quantities may be one of a reference signal receive power (RSRP), a radio signal strength indicator (RSSI), or a signal to noise ratio (SNR), and at least one of the first or second physical layer communications may be one of a synchronization signal block (SSB), a channel state information reference signal (CSI-RS), a physical downlink control channel (PDCCH), a demodulation reference signal (DMRS) associated with the PDCCH, a non-demodulation reference signal (non-DMRS) associated with the PDCCH, a physical downlink shared channel (PDSCH), a DMRS associated with the PDSCH, a non-DMRS associated with the PDSCH, or a reference signal (RS).

In some aspects, the first physical layer communication may be a synchronization signal block (SSB) communication and the second physical layer communication may be a channel state information reference signal (CSI-RS) communication, or the first physical layer communication may be a physical downlink control channel (PDCCH) communication and the second physical layer communication may be a physical downlink shared channel (PDSCH) communication. In some aspects, the first physical layer communication and the second physical layer communication may both be physical downlink control channel (PDCCH) communications, physical downlink shared channel (PDSCH) communications, or reference signal (RS) communications.

In some aspects, determining the first signal measurement quantity based on the first physical layer communication may include determining a reference signal receive power (RSRP) based on a synchronization signal block (SSB), determining the second signal measurement quantity based on the second physical layer communication may include determining an RSRP based on a channel state information reference signal (CSI-RS), and determining the difference between the first signal measurement quantity and the second signal measurement quantity may include determining the difference between the RSRP of the SSB and the RSRP of the CSI-RS.

In some aspects, determining the first signal measurement quantity based on the first physical layer communication may include determining a radio signal strength indicator (RSSI) based on a demodulation reference signal (DMRS) associated with a physical downlink control channel (PDCCH), determining the second signal measurement quantity based on the second physical layer communication may include determining an RSSI based on a non-demodulation reference signal (non-DMRS) associated with the PDCCH, and determining the difference between the first signal measurement quantity and the second signal measurement quantity may include determining the difference between the RSSI of the DMRS associated with the PDCCH and the RSSI of the non-DMRS associated with the PDCCH.

In some aspects, determining the first signal measurement quantity based on the first physical layer communication may include determining a normalized signal to noise ratio (SNR) based on a demodulation reference signal (DMRS) associated with a physical downlink control channel (PDCCH), determining the second signal measurement quantity based on the second physical layer communication may include determining a normalized SNR based on a non-demodulation reference signal (non-DMRS) associated with the PDCCH, and determining the difference between the first signal measurement quantity and the second signal measurement quantity may include determining the difference between the normalized SNR of the DMRS associated with the PDCCH and the normalized SNR of the non-DMRS associated with the PDCCH.

In some aspects, determining the first signal measurement quantity based on the first physical layer communication may include determining a radio signal strength indicator (RSSI) based on a physical downlink control channel (PDCCH), determining the second signal measurement quantity based on the second physical layer communication may include determining an RSSI based on a physical downlink shared channel (PDSCH), and determining the difference between the first signal measurement quantity and the second signal measurement quantity may include determining the difference between the RSSI of the PDCCH and the RSSI of the PDSCH.

In some aspects, determining the first signal measurement quantity based on the first physical layer communication may include determining a radio signal strength indicator (RSSI) based on a demodulation reference signal (DMRS) associated with a physical downlink shared channel (PDSCH), determining the second signal measurement quantity based on the second physical layer communication may include determining an RSSI based on a non-demodulation reference signal (non-DMRS) associated with the PDSCH, and determining the difference between the first signal measurement quantity and the second signal measurement quantity may include determining the difference between the RSSI of the DMRS associated with the PDSCH and the RSSI of the non-DMRS associated with the PDSCH.

In some aspects, determining the first signal measurement quantity based on the first physical layer communication may include determining a normalized signal to noise ratio (SNR) based on a demodulation reference signal (DMRS) associated with a physical downlink shared channel (PDSCH), determining the second signal measurement quantity based on the second physical layer communication may include determining a normalized SNR based on a non-demodulation reference signal (non-DMRS) associated with the PDSCH, and determining the difference between the first signal measurement quantity and the second signal measurement quantity may include determining the difference between the normalized SNR of the DMRS associated with the PDSCH and the normalized SNR of the non-DMRS associated with the PDSCH.

In some aspects, determining the first signal measurement quantity based on the first physical layer communication may include determining a radio signal strength indicator (RSSI) based on a reference signal (RS), determining the second signal measurement quantity based on the second physical layer communication may include determining a reference signal receive power (RSRP) based on the RS, and determining the difference between the first signal measurement quantity and the second signal measurement quantity may include determining the difference between the RSSI of the RS and the RSRP of the RSSI.

Some aspects may include receiving from a base station a value identifying a relationship between a transmit power of the first physical layer communication and a transmit power of the second physical layer communication, and determining the threshold based on the relationship between a transmit power of the first physical layer communication and a transmit power of the second physical layer communication. Some aspects may include receiving from a base station at least one Quasi Co-location (QCL) value corresponding to at least one of the first signal measurement quantity or the second signal measurement quantity, and determining the threshold based on the received at least one QCL value.

Further aspects may include a wireless device having a processor configured to perform one or more operations of any of the methods summarized above. Further aspects may include a non-transitory processor-readable storage medium having stored thereon processor-executable instructions configured to cause a processor of a wireless device to perform operations of any of the methods summarized above. Further aspects include a wireless device having means for performing functions of any of the methods summarized above. Further aspects include a system on chip for use in a wireless device that includes a processor configured to perform one or more operations of any of the methods summarized above. Further aspects include a system in a package that includes two systems on chip for use in a wireless device that includes a processor configured to perform one or more operations of any of the methods summarized above.

Some aspects may include a processor in a base station sending a value identifying a relationship between a transmit power of a first physical layer communication and a transmit power of a second physical layer communication to the wireless device. Some aspects may include a processor in a base station sending a Quasi Co-location value corresponding to a signal measurement for a first physical layer communication to the wireless device. In some aspects, sending the value identifying the relationship between the transmit power of the first physical layer communication and the transmit power of the second physical layer communication to the wireless device may include sending a value identifying a difference between the transmit power of the first physical layer communication and the transmit power of the second physical layer communication to the wireless device.

Further aspects may include a base station of a wireless network having a processor configured to perform one or more operations of any of the base station methods summarized above. Further aspects may include a non-transitory processor-readable storage medium having stored thereon processor-executable instructions configured to cause a processor of a base station to perform operations of any of the base station methods summarized above. Further aspects include a base station having means for performing functions of any of the base station methods summarized above.

BRIEF DESCRIPTION OF THE DRAWINGS

The accompanying drawings, which are incorporated herein and constitute part of this specification, illustrate exemplary embodiments of the claims, and together with the general description given above and the detailed description given below, serve to explain the features of the claims.

DETAILED DESCRIPTION

Figure 1:
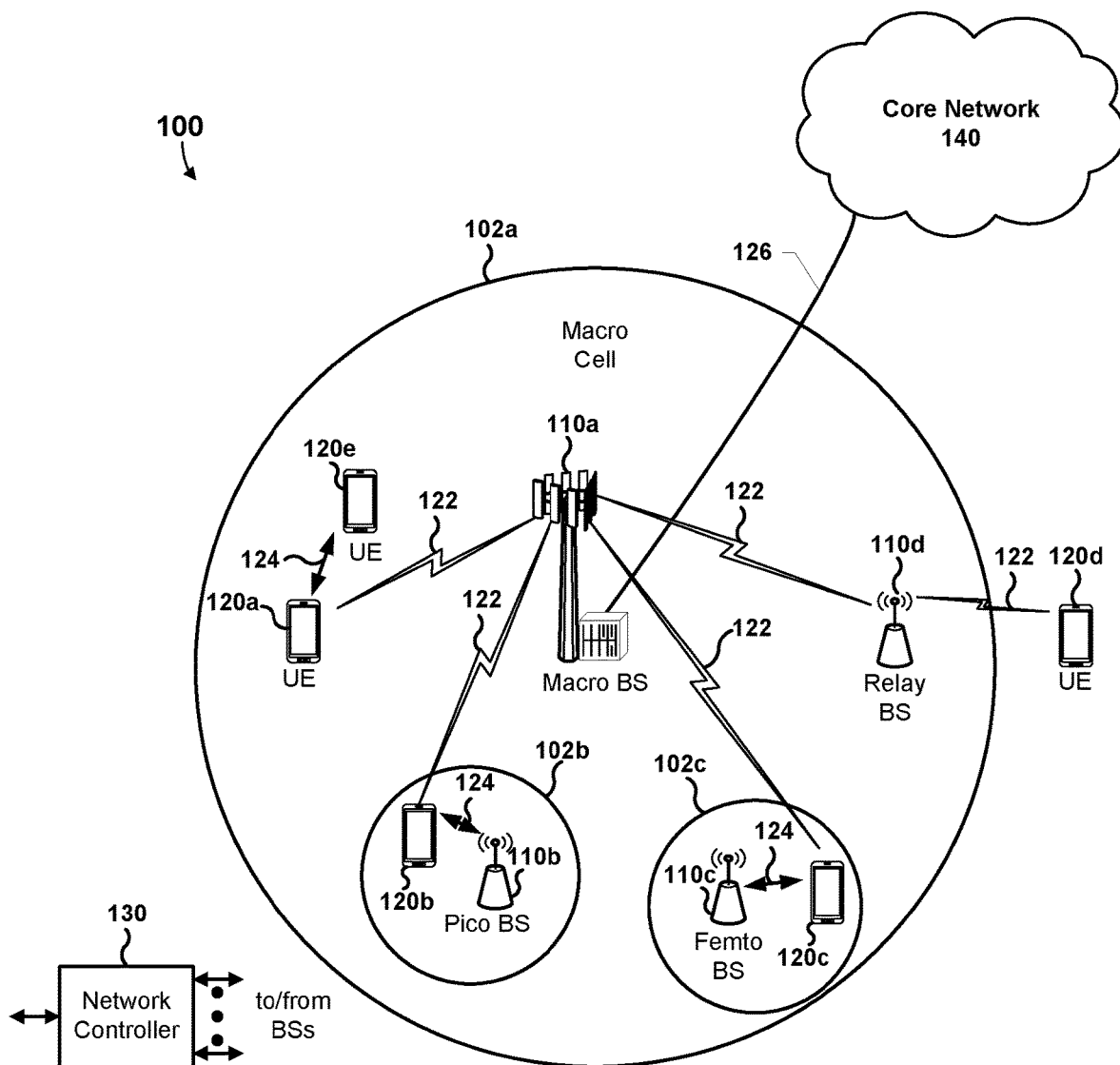
FIG. 1 is a system block diagram conceptually illustrating an example communications system including a small cell and a problem that can develop in such systems.

Various embodiments will be described in detail with reference to the accompanying drawings. Wherever possible, the same reference numbers will be used throughout the drawings to refer to the same or like parts. References made to particular examples and embodiments are for illustrative purposes, and are not intended to limit the scope of the claims.

In overview, various embodiments include methods, and components (e.g., wireless devices, IoT devices, base stations, etc.) configured to implement the methods, for detecting and responding to the presence of a jammer or non-benign entity (e.g., smart jammer, etc.) that targets physical layer channels in a communication network by comparing two or more communication metrics. In various embodiments, a wireless device may be configured to determine a first signal measurement (e.g., RSRP, RSSI, SNR, etc.) based on a first physical layer communication (e.g., SSB, CSI-RS, PDCCH, DMRS, PDSCH, RS, etc.), determine a second signal measurement (e.g., RSRP, RSSI, SNR, etc.) based on a second physical layer communication (e.g., SSB, CSI-RS, PDCCH, DMRS, PDSCH, RS, etc.), determine a difference between the first signal measurement and the second signal measurement quantity, determine whether the difference between the first signal measurement and the second signal measurement satisfies a threshold (e.g., is greater than a threshold value, or is greater than or equal to a threshold value, such as, 3 decibels, 10 decibels, 15 decibels, 20 decibels, etc.), determine whether a jammer or non-benign entity is present in a network in response to determining that the difference between the first signal measurement and the second signal measurement satisfies the threshold, and perform a mitigation operation in response to determining that a jammer or non-benign entity is present in the network. In some embodiments, the mitigation operation may include reporting the activities of the network entity to a security server of the communication network, or updating one or more communication parameters to access the communication network using a different frequency, band or system.

In some embodiments, determining the first and/or second signal measurements on the first and/or second physical layer communications may include determining one or more of a reference signal receive power (RSRP) measurement, a radio signal strength indicator (RSSI) measurement, and/or a signal to noise ratio (SNR) for one or more of a synchronization signal block (SSB), a channel state information reference signal (CSI-RS), a physical downlink control channel (PDCCH), a demodulation reference signal (DMRS) associated with the PDCCH, a non-demodulation reference signal (non-DMRS) associated with the PDCCH, a physical downlink shared channel (PDSCH), a DMRS associated with the PDSCH, a non-DMRS associated with the PDSCH, and/or a reference signal (RS) resource element.

In some embodiments, the first and second physical layer communications may be different types of physical layer communications. For example, the first physical layer communication may be an SSB transmission/communication and the second physical layer communication may be a channel state information reference signal (CSI-RS) transmission/communication. As another example, the first physical layer communication may be a PDCCH transmission/communication and the second physical layer communication may be a PDSCH transmission/communication.

In some embodiments, the first and second physical layer communications may be the same type of physical layer communication. For example, both the first and second physical layer communications may be PDCCH transmissions/communications. As other examples, both the first and second physical layer communications may be PDSCH transmissions/communications or RS transmissions/communications.

In some embodiments, the first and/or second signal measurements may be the same type of signal measurements. For example, determining the first signal measurement based on the first physical layer communication may include the wireless device determining a RSRP value/quantity based on the SSB (SSM RSRP), and determining the second signal measurement based on the second physical layer communication may include the wireless device determining an RSRP value/quantity based on the CSI-RS (CSI-RS RSRP). As such, in some embodiments, the wireless device may determine that a jammer or non-benign entity is present in the network in response to determining that the difference between the SSB RSRP and CSI-RS RSRP satisfy a threshold (e.g., the difference between the SSM RSRP and CSI-RS RSRP is greater than a threshold value, or is greater than or equal to a threshold value, such as, 3 decibels, 10 decibels, 15 decibels, 20 decibels, etc.).

In some embodiments, the first and/or second signal measurements may be different types of signal measurements. For example, determining the first signal measurement based on the first physical layer communication may include the wireless device determining an RSSI value/quantity based on a RS resource element, and determining the second signal measurement based on the second physical layer communication may include the wireless device determining an RSRP based on the RS resource element. The wireless device may determine that a jammer or non-benign entity is present in the network in response to determining that the difference between the RSSI and the RSRP of the RS resource element satisfies a threshold.

In some embodiments, the wireless device may be configured to determine the threshold value based on a relationship (e.g., difference, etc.) between a transmit power of the first physical layer communication and a transmit power of the second physical layer communication. In some embodiments, the wireless device may determine the threshold value based on information received from the base station. For example, in some embodiments the wireless device may be configured to receive, from the base station, a value identifying the relationship between the transmit power of the first physical layer communication and the transmit power of the second physical layer communication.

In some embodiments, the wireless device may be configured to intelligently and dynamically determine the physical layer communications and/or the types of signal measurements to collect, measure, compare or evaluate based on one or more Quasi Co-location (QCL) values received from the base station.

A number of different cellular and mobile communication services and standards are available or contemplated in the future, all of which may implement and benefit from the various embodiments. Such services and standards include, e.g., Third Generation Partnership Project (3GPP), long term evolution (LTE) systems, third generation wireless mobile communication technology (3G), fourth generation wireless mobile communication technology (4G), fifth generation wireless mobile communication technology (5G), global system for mobile communications (GSM), universal mobile telecommunications system (UMTS), 3GSM, general packet radio service (GPRS), code division multiple access (CDMA) systems (e.g., cdmaOne, CDMA2000™), enhanced data rates for GSM evolution (EDGE), advanced mobile phone system (AMPS), digital AMPS (IS-136/TDMA), evolution-data optimized (EV-DO), and digital enhanced cordless telecommunications (DECT). Each of these technologies involves, for example, the transmission and reception of voice, data, signaling, and/or content messages. It should be understood that any references to terminology and/or technical details related to an individual telecommunication standard or technology are for illustrative purposes only, and are not intended to limit the scope of the claims to a particular communication system or technology unless specifically recited in the claim language.

The term "wireless device" is used herein to refer to any one or all of wireless router devices, wireless appliances, cellular telephones, smartphones, portable computing devices, personal or mobile multi-media players, laptop computers, tablet computers, smartbooks, ultrabooks, palmtop computers, wireless electronic mail receivers, multimedia Internet-enabled cellular telephones, medical devices and equipment, biometric sensors/devices, wearable devices including smart watches, smart clothing, smart glasses, smart wrist bands, smart jewelry (e.g., smart rings, smart bracelets, etc.), entertainment devices (e.g., wireless gaming controllers, music and video players, satellite radios, etc.), wireless-network enabled Internet of Things (IoT) devices including smart meters/sensors, industrial manufacturing equipment, large and small machinery and appliances for home or enterprise use, wireless communication elements within autonomous and semiautonomous vehicles, wireless devices affixed to or incorporated into various mobile platforms, global positioning system devices, and similar electronic devices that include a memory, wireless communication components and a programmable processor.

The term "system on chip" (SOC) is used herein to refer to a single integrated circuit (IC) chip that contains multiple resources and/or processors integrated on a single substrate. A single SOC may contain circuitry for digital, analog, mixed-signal, and radio-frequency functions. A single SOC may also include any number of general purpose and/or specialized processors (digital signal processors, modem processors, video processors, etc.), memory blocks (e.g., ROM, RAM, Flash, etc.), and resources (e.g., timers, voltage regulators, oscillators, etc.). SOCs may also include software for controlling the integrated resources and processors, as well as for controlling peripheral devices.

The term "system in a package" (SIP) may be used herein to refer to a single module or package that contains multiple resources, computational units, cores and/or processors on two or more IC chips, substrates, or SOCs. For example, a SIP may include a single substrate on which multiple IC chips or semiconductor dies are stacked in a vertical configuration. Similarly, the SIP may include one or more multi-chip modules (MCMs) on which multiple ICs or semiconductor dies are packaged into a unifying substrate. A SIP may also include multiple independent SOCs coupled together via high speed communication circuitry and packaged in close proximity, such as on a single motherboard or in a single wireless device. The proximity of the SOCs facilitates high speed communications and the sharing of memory and resources.

The term "multicore processor" may be used herein to refer to a single integrated circuit (IC) chip or chip package that contains two or more independent processing cores (e.g., CPU core, Internet protocol (IP) core, graphics processor unit (GPU) core, etc.) configured to read and execute program instructions. A SOC may include multiple multicore processors, and each processor in an SOC may be referred to as a core. The term "multiprocessor" may be used herein to refer to a system or device that includes two or more processing units configured to read and execute program instructions.

Generally, numerology refers to a group of telecommunication parameters called bandwidth parts (BWP), which in orthogonal frequency division multiplexing (OFDM) include subcarrier spacing (SCS or $\Delta f$), slot duration, symbol length, cyclic prefix (CP), cyclic prefix duration, and other parameters that define the frame and lattice structure of the waveform. In 5G NR, the numerology may be based on exponentially scalable sub-carrier spacing (e.g., $\Delta f = 2\mu \times 15$ kHz) with $\mu = \{0,1,3,4\}$ for the primary synchronization signal (PSS), secondary synchronization signal (SSS) and physical broadcast channel (PBCH), and $\mu = \{0,1,2,3\}$ for other channels. A 5G NR capable wireless device (e.g., wireless device 120a-120e discussed below with reference to FIG. 1) may be configured with multiple BWPs on a given component carrier, but only one BWP may be active at a time. The active BWP defines the wireless device's operating bandwidth within the cell's operating bandwidth.

5G NR downlink (DL) and uplink (UL) transmissions may be organized into frames of 10 ms duration. Each frame may include ten 1 ms subframes. Each subframe may include one or more slots. A slot may include 12 or 14 symbols (time domain resources) across a number of sub-carriers. The slots may scale in time as a function of the sub-carrier spacing so that there is always an integer number of slots in a subframe. As an example, for numerology $\mu = 0$, each subframe includes one slot of 14 symbols, and thus the slot duration is 1 ms. For numerology $\mu = 1$, each subframe includes 2 slots, and thus the slot duration is 0.5 ms.

A symbol may be a time domain resource that carries information. A resource block (RB) may be a frequency domain resource that carries information. A resource block may include 12 consecutive resource elements (REs) in the frequency domain and may be 1 slot long in time. A resource element may identify a resource in the air link, may be uniquely identified by a symbol and tone index, or may be a granular unit of information that is unique in both the time domain and the frequency domain. A resource element may include one subcarrier in frequency domain and one OFDM symbol in time domain.

5G NR transmissions may include a synchronization signal block (SSB), system information (SI), reference signals (RS), a physical downlink control channel (PDCCH), a physical downlink shared channel (PDSCH), demodulation reference signals (DMRS), phase tracking reference signals (PTRSs), sounding reference signals (SRS), channel state information reference signals (CSI-RS) and other physical layer channels, signals, signal blocks, resource elements and/or information, all of which are provided to enable wireless devices to establish communication links with a base station transmitting such information.

For example, a 5G NR base station may transmit the SSB in three or more orthogonal frequency division multiplexing (OFDM) symbols across 240 subcarriers and in pre-defined bursts across the time domain. When a wireless device is powered on or is moved into a new geographical area, the wireless device may perform cell search and selection operations that include detecting and decoding the SSB. The SSB may include information used by the wireless device to obtain system information and collect wireless signal measurements. For example, the first symbol in the SSB may be a primary synchronization signal (PSS), the second symbol may be a physical broadcast channel (PBCH), and the third symbol may be a secondary synchronization signal (SSS). The wireless device may receive and decode the PBCH to receive basic system configuration information in a master information block (MIB). The basic system configuration information may include system bandwidth information, the number of transmit antennas used by the base station, physical hybrid-ARQ indicator channel (PHICH) configuration information, a PHICH Ng value, a system frame number (SFN), and other similar information.

In addition, the wireless device may receive system information (SI) in system information messages, which are referred to as system information blocks (SIB). A base station transmits different types of SIBs to provide wireless devices with different SI. For example, in LTE systems, a "SIB 1" message may include scheduling information, cell access information and cell selection information, while SIBs numbered from 2 to 17 may include other well-defined types or categories of information (e.g., common channel configuration information, uplink frequency information, etc.). In 5G NR systems, the MIB and SIBs may be divided into "Minimum SI" and "Other SI" messages. The Minimum SI may include the MIB and SIB 1, and the Other SI may include all SIBs that are not broadcast or sent as part of the Minimum SI. The MIB of the Minimum SI may include essential physical layer information for a cell, including configuration information for the control resource set (CORESET) for scheduling SIB1 transmissions. The SIB 1 of the Minimum SI may include information for scheduling transmissions of the other SIBs and information used as part of the initial access procedure. SIB1 is also sometimes referred to as Remaining Minimum SI (RMSI) in 5G NR systems.

A 5G NR base station may transmit the physical downlink control channel (PDCCH) on an aggregation of one or more consecutive control channel elements (CCEs) in a CORESET. The PDCCH carries or communicates physical layer specific information, such as the resources that are identified for the data channel, transmit power control information used by the wireless device for determining whether to increase or decrease transmit power, scheduling assignments and other control information used by the wireless device to receive and decode a data channel and its corresponding data. The PDCCH may be associated with a demodulation reference signal (DMRS), which may be transmitted using the same precoding matrix as the PDCCH.

The demodulation reference signal (DMRS) may be a device specific signal or resource element (RE) that is included in the same precoding matrix as the physical downlink control channel (PDCCH) and used by the wireless device to estimate the radio channel. All other resource elements in the transmission or precoding matrix may be referred to herein as non-demodulation reference signals (non-DMRS).

In 5G NR, a demodulation reference signal (DMRS) may be associated with the phase tracking reference signal (PTRS), which may be used by the wireless device to suppress phase noise and common phase errors at higher frequencies (e.g., millimeter wave or "mmWave" frequencies). Channel state information reference signals (CSI-RS) may be downlink transmissions that are used by the wireless device to estimate the channel and report channel quality information back to the base station. Sounding reference signals (SRS) may be uplink transmissions that are used by the base station to obtain channel state information (CSI) for each user device.

A jammer or blocker is a device that deliberately transmits wireless communication signals (or jamming signals) to disrupt wireless communications between the wireless device and the base station. A physical layer jammer may be a jammer that targets physical layer channels, signals and communications. For example, a physical layer jammer may transmit high noise jamming signals that prevent the wireless device from being able to receive or decode the PDCCH transmitted by a network component (e.g., base station, wireless router, etc.). A wireless device that is unable to decode the PDCCH may not be able to receive and decode a data channel, or use the communication network to send or receive data messages. For example, on the downlink, a PDCCH jammer may prevent the wireless device from receiving or decoding any one or more of the RMSI (SIB1), the Other SI, Msg2 of the attach procedure, downlink grants or the associated radio resource control (RRC) signaling/data (for decoding signaling messages), or aperiodic channel status information (A-CSI) report triggers. The uplink functions of wireless devices may be disrupted by the PDCCH jammer preventing the wireless device from receiving or decoding uplink grants or the associated signaling/traffic, aperiodic SRS triggers, or the power control commands for the physical uplink control channel (PUCCH) or physical uplink shared channel (PUSCH). Thus, a PDCCH jammer may disrupt wireless communications by preventing a wireless device from decoding the PDCCH or information within such messages required by the wireless device to use the communication network.

A wireless device may be configured to detect the presence or existence of a jammer by monitoring the 5G NR transmissions for high noise signals (e.g., a signal that has low signal quality, low SNR, etc.) that prevent wireless devices from receiving and decoding transmissions from a base station. However, the presence of high noise signals does not necessarily indicate the presence of a jammer However, a transmission with a high PDCCH radio signal strength indicator (RSSI) and low DMRS signal to noise ratio (SNR) may indicate that jammer or non-benign entity (e.g., a PDCCH jammer, etc.) is present. As such, in some embodiments, the wireless device may be configured to receive the PDCCH and DMRS, determine a radio signal strength indicator (RSSI) for the received PDCCH, determine a signal to noise ratio (SNR) for the DMRS, determine whether the RSSI satisfies a first threshold, and determine whether the DMRS SNR satisfies a second threshold, and determine that a jammer or non-benign network entity is present in the network in response to determining that the PDCCH RSSI satisfies the first threshold (e.g., that the signal strength is high) and the DMRS SNR does not satisfy the second threshold (e.g., that the signal quality is not high enough).

A smart jammer may attempt to avoid detection by conventional jammer detection solutions and/or wireless devices that test for high signal strength (e.g., PDCCH RSSI) or low signal quality (e.g., low DMRS SNR) by jamming only a portion of the 5G NR transmissions. For example, in 5G NR networks, any network entity may readily determine the resource elements (REs) in which CSI-RS is being transmitted. As such, a smart jammer may determine the REs in which CSI-RS is being transmitted, and transmit a jamming signal (e.g., randomly generated noise) only on the REs in which CSI-RS is being transmitted. This may cause the wireless device to determine that the channel has a poor signal quality, and report the existence of the low-quality channel back to the base station. In response, the base station may schedule the wireless device so that it receives data at an extremely low data rate that is commensurate with the detected signal quality of the channel. Alternatively, the base station may choose not to schedule the wireless device to receive data for a certain amount of time (within some limits the base station can choose to not schedule a wireless device). By prompting the base station to reduce the data rate to a wireless device to a low throughput or suspend transmission of data to the wireless device, a smart jammer can effectively prevent the wireless device from using the communication network.

As another example, a smart jammer could avoid detection by conventional jammer detection solutions and/or wireless devices that test for high signal strength or low signal quality by not jamming the PDCCH DMRS resource elements. If a smart jammer does not jam the PDCCH DMRS resource elements, a wireless device implementing conventional jammer detection solutions may determine that the level of noise is low, that the quality of the signal is high, or that the received signals exhibit a high signal-to-noise ratio. This could prevent a wireless device that implements a conventional jammer detection solution from detecting the presence or existence of such a smart jammer.

Various embodiments include methods of detecting the presence in a network of a jammer or non-benign entity (e.g., smart jammer, etc.) that targets physical layer channels in a communication network by comparing two or more wireless signal metrics or measurements. In some embodiments, a wireless device processor may be configured to detect the presence of a selective jamming event by comparing a metric derived from two or more signal measurement quantities with a threshold. In various embodiments, the signal measurement quantities may correspond to same or different signals and same or different quantities.

In some embodiments, the wireless device processor may be configured to detect the presence of selective jamming on SSB or CSI-RS resource elements (RE's) by deriving the difference between a first signal measurement quantity of RSRP obtained from SSB RE's with second signal measurement quantity of RSRP obtained from CSI-RS RE's and comparing the difference with a threshold. In some embodiments, the wireless device processor may be configured to determine the threshold based, at least in part, on the difference between the transmit power of SSB and CSI-RS.

In some embodiments, the wireless device processor may be configured to detect the presence of selective jamming on non-DMRS PDCCH RE's by deriving the difference between a first signal measurement quantity of RSSI on PDCCH DMRS RE's with second signal measurement quantity of RSSI on non-DMRS PDCCH RE's and comparing the difference with a threshold. In some embodiments, the wireless device processor may be configured to determine the threshold based, at least in part, on the difference between the transmit power of PDCCH DMRS and PDCCH non-DMRS RE's.

In some embodiments, the wireless device processor may be configured to detect the presence of selective jamming on non-DMRS PDCCH RE's by deriving the difference between a first signal measurement quantity of normalized SNR on PDCCH DMRS RE's with second signal measurement quantity of normalized SNR on non-DMRS PDCCH RE's and comparing the difference with a threshold. In some embodiments, upon successful decoding of PDCCH, the wireless device processor may perform operations that include re-encoding the decoded PDCCH information bits and calculating a distance between the re-encoded bit sequence with the soft bits input to error correction decoder and using the normalized distance as a measure of normalized SNR on non-DMRS PDCCH RE's. In some embodiments, the wireless device processor may be configured to determine the threshold based, at least in part, on the difference between the transmit power of PDCCH DMRS and PDCCH non-DMRS RE's.

In some embodiments, the wireless device processor may be configured to detect the presence of selective jamming on PDSCH RE's by deriving the difference between a first signal measurement quantity of RSSI on PDCCH RE's with second signal measurement quantity of RSSI on PDSCH RE's and comparing the difference with a threshold. In some embodiments, the wireless device processor may be configured to determine the threshold based, at least in part, on the difference between the transmit power of PDCCH and PDSCH.

In some embodiments, the wireless device processor may be configured to detect the presence of selective jamming on non-DMRS PDSCH RE's by deriving the difference between a first signal measurement quantity of RSSI on PDSCH DMRS RE's with second signal measurement quantity of RSSI on non-DMRS PDSCH RE's and comparing the difference with a threshold. In some embodiments, the wireless device processor may be configured to determine the threshold based, at least in part, on the difference between the transmit power of PDSCH DMRS and PDSCH non-DMRS RE's.

In some embodiments, the wireless device processor may be configured to detect the presence of selective jamming on non-DMRS PDSCH RE's by deriving the difference between a first signal measurement quantity of normalized SNR on PDSCH DMRS RE's with second signal measurement quantity of normalized SNR on non-DMRS PDSCH RE's and comparing the difference with a threshold. In some embodiments, upon successful decoding of PDSCH, the wireless device processor may perform operations that include re-encoding the decoded PDSCH information bits and calculating a distance between the re-encoded bit sequence with the soft bits input to error correction decoder and using the normalized distance as a measure of normalized SNR on non-DMRS PDSCH RE's. In some embodiments, the wireless device processor may be configured to determine the threshold based, at least in part, on the difference between the transmit power of PDSCH DMRS and PDSCH non-DMRS RE's.

In some embodiments, the wireless device processor may be configured to detect selective jamming on a reference signal (RS) by comparing the RS RSSI with the RS RSRP. In some embodiments, the wireless device processor may be configured to detect the presence of selective jamming on a reference signals RE's by comparing a first signal measurement quantity of RSSI with second signal measurement quantity of RSRP (both measurement quantities obtained from the RS RE's) and comparing the difference with a threshold.

Some embodiments may include a network component (e.g., a base station, etc.) that is configured to signal the difference in transmit power and Quasi Co-location (QCL) assumptions corresponding to one or more signal measurement quantities to enable the wireless device to choose the signals that are measured and/or to compute corresponding threshold for selective jamming detection operations.

In some embodiments, the network component may be configured to provide information to the wireless device to facilitate detection of a selective jamming event, the information enabling the wireless device to compare a metric derived from two or more signal measurement quantities with a threshold. The signal measurement quantities may correspond to same or different signals and same or different quantities.

In some embodiments, the network component may be configured to provide the transmit power and QCL relationship of SSB and CSI-RS, used in part to determine a threshold that may be used by the wireless device for comparison against a metric derived from a first signal measurement quantity of RSRP obtained from SSB RE's with second signal measurement quantity of RSRP obtained from CSI-RS RE's to detect the presence of selective jamming on SSB or CSI-RS resource elements (RE's).

In some embodiments, the network component may be configured to provide the transmit power relationship between PDCCH DMRS and PDCCH non-DMRS RE's, which may be used by the wireless device to determine the threshold used by the wireless device to compare a metric derived from a first signal measurement quantity of RSSI obtained from PDCCH DMRS RE's with second signal measurement quantity of RSSI obtained from PDCCH non-DMRS RE's to detect the presence of selective jamming on PDCCH non-DMRS RE's.

In some embodiments, the network component may be configured to provide the transmit power and QCL relationship between PDCCH and PDSCH RE's, used in part by the wireless device to determine a threshold, the threshold used by the wireless device for comparison against a metric derived from a first signal measurement quantity of RSSI obtained from PDCCH RE's with second signal measurement quantity of RSSI obtained from PDSCH RE's to detect the presence of selective jamming on PDSCH.

In some embodiments, the network component may be configured to provide the transmit power relationship between PDSCH DMRS and PDSCH non-DMRS RE's, which may be used by the wireless device to determine the threshold used by the wireless device to compare a metric derived from a first signal measurement quantity of RSSI obtained from PDSCH DMRS RE's with second signal measurement quantity of RSSI obtained from PDSCH non-DMRS RE's to detect the presence of selective jamming on PDSCH non-DMRS RE's.

FIG. 1 illustrates an example of a communications system 100 that is suitable for implementing various embodiments. The communications system 100 may be an 5G NR network, or any other suitable network such as an LTE network.

The communications system 100 may include a heterogeneous network architecture that includes a core network 140 and a variety of mobile devices (illustrated as wireless device 120a-120e in FIG. 1). The communications system 100 may also include a number of base stations (illustrated as the BS 110a, the BS 110b, the BS 110c, and the BS 110d) and other network entities. A base station is an entity that communicates with wireless devices (mobile devices), and also may be referred to as an NodeB, a Node B, an LTE evolved nodeB (eNB), an access point (AP), a radio head, a transmit receive point (TRP), a New Radio base station (NR BS), a 5G NodeB (NB), a Next Generation NodeB (gNB), or the like. Each base station may provide communication coverage for a particular geographic area. In 3GPP, the term "cell" can refer to a coverage area of a base station, a base station subsystem serving this coverage area, or a combination thereof, depending on the context in which the term is used.

A base station 110a-110d may provide communication coverage for a macro cell, a pico cell, a femto cell, another type of cell, or a combination thereof. A macro cell may cover a relatively large geographic area (for example, several kilometers in radius) and may allow unrestricted access by mobile devices with service subscription. A pico cell may cover a relatively small geographic area and may allow unrestricted access by mobile devices with service subscription. A femto cell may cover a relatively small geographic area (for example, a home) and may allow restricted access by mobile devices having association with the femto cell (for example, mobile devices in a closed subscriber group (CSG)). A base station for a macro cell may be referred to as a macro BS. A base station for a pico cell may be referred to as a pico BS. A base station for a femto cell may be referred to as a femto BS or a home BS. In the example illustrated in FIG. 1, a base station 110a may be a macro BS for a macro cell 102a, a base station 110b may be a pico BS for a pico cell 102b, and a base station 110c may be a femto BS for a femto cell 102c. A base station 110a-110d may support one or multiple (for example, three) cells. The terms "eNB", "base station", "NR BS", "gNB", "TRP", "AP", "node B", "5G NB", and "cell" may be used interchangeably herein.

In some examples, a cell may not be stationary, and the geographic area of the cell may move according to the location of a mobile base station. In some examples, the base stations 110a-110d may be interconnected to one another as well as to one or more other base stations or network nodes (not illustrated) in the communications system 100 through various types of backhaul interfaces, such as a direct physical connection, a virtual network, or a combination thereof using any suitable transport network The base station 110a-110d may communicate with the core network 140 over a wired or wireless communication link 126. The wireless device 120a-120e may communicate with the base station 110a-110d over a wireless communication link 122.

The wired communication link 126 may use a variety of wired networks (e.g., Ethernet, TV cable, telephony, fiber optic and other forms of physical network connections) that may use one or more wired communication protocols, such as Ethernet, Point-To-Point protocol, High-Level Data Link Control (HDLC), Advanced Data Communication Control Protocol (MIMO ADCCP), and Transmission Control Protocol/Internet Protocol (TCP/IP).

The communications system 100 also may include relay stations (e.g., relay BS 110d). A relay station is an entity that can receive a transmission of data from an upstream station (for example, a base station or a mobile device) and send a transmission of the data to a downstream station (for example, a wireless device or a base station). A relay station also may be a mobile device that can relay transmissions for other wireless devices. In the example illustrated in FIG. 1, a relay station 110d may communicate with macro the base station 110a and the wireless device 120d in order to facilitate communication between the base station 110a and the wireless device 120d. A relay station also may be referred to as a relay base station, a relay base station, a relay, etc.

The communications system 100 may be a heterogeneous network that includes base stations of different types, for example, macro base stations, pico base stations, femto base stations, relay base stations, etc. These different types of base stations may have different transmit power levels, different coverage areas, and different impacts on interference in communications system 100. For example, macro base stations may have a high transmit power level (for example, 5 to 40 Watts) whereas pico base stations, femto base stations, and relay base stations may have lower transmit power levels (for example, 0.1 to 2 Watts).

A network controller 130 may couple to a set of base stations and may provide coordination and control for these base stations. The network controller 130 may communicate with the base stations via a backhaul. The base stations also may communicate with one another, for example, directly or indirectly via a wireless or wireline backhaul.

The wireless devices 120a, 120b, 120c may be dispersed throughout communications system 100, and each wireless device may be stationary or mobile. A wireless device also may be referred to as an access terminal, a terminal, a mobile station, a subscriber unit, a station, etc.

A macro base station 110a may communicate with the communication network 140 over a wired or wireless communication link 126. The wireless devices 120a, 120b, 120c may communicate with a base station 110a-110d over a wireless communication link 122.

The wireless communication links 122, 124 may include a plurality of carrier signals, frequencies, or frequency bands, each of which may include a plurality of logical channels. The wireless communication links 122 and 124 may utilize one or more radio access technologies (RATs). Examples of RATs that may be used in a wireless communication link include 3GPP LTE, 3G, 4G, 5G (e.g., NR), GSM, Code Division Multiple Access (CDMA), Wideband Code Division Multiple Access (WCDMA), Worldwide Interoperability for Microwave Access (WiMAX), Time Division Multiple Access (TDMA), and other mobile telephony communication technologies cellular RATs. Further examples of RATs that may be used in one or more of the various wireless communication links 122, 124 within the communication system 100 include medium range protocols such as Wi-Fi, LTE-U, LTE-Direct, LAA, MuLTEfire, and relatively short range RATs such as ZigBee, Bluetooth, and Bluetooth Low Energy (LE).

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block") may be 12 subcarriers (or 180 kHz). Consequently, the nominal Fast File Transfer (FFT) size may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz (i.e., 6 resource blocks), and there may be 1, 2, 4, 8 or 16 subbands for system bandwidth of 1.25, 2.5, 5, 10 or 20 MHz, respectively.

While descriptions of some embodiments may use terminology and examples associated with LTE technologies, various embodiments may be applicable to other wireless communications systems, such as a new radio (NR) or 5G network. NR may utilize OFDM with a cyclic prefix (CP) on the uplink (UL) and downlink (DL) and include support for half-duplex operation using time division duplex (TDD). A single component carrier bandwidth of 100 MHz may be supported. NR resource blocks may span 12 sub-carriers with a sub-carrier bandwidth of 75 kHz over a 0.1 ms duration. Each radio frame may consist of 50 subframes with a length of 10 ms. Consequently, each subframe may have a length of 0.2 ms. Each subframe may indicate a link direction (i.e., DL or UL) for data transmission and the link direction for each subframe may be dynamically switched. Each subframe may include DL/UL data as well as DL/UL control data. Beamforming may be supported and beam direction may be dynamically configured. Multiple Input Multiple Output (MIMO) transmissions with precoding may also be supported. MIMO configurations in the DL may support up to eight transmit antennas with multi-layer DL transmissions up to eight streams and up to two streams per wireless device. Multi-layer transmissions with up to 2 streams per wireless device may be supported. Aggregation of multiple cells may be supported with up to eight serving cells. Alternatively, NR may support a different air interface, other than an OFDM-based air interface.

Some mobile devices may be considered machine-type communication (MTC) or evolved or enhanced machine-type communication (eMTC) mobile devices. MTC and eMTC mobile devices include, for example, robots, drones, remote devices, sensors, meters, monitors, location tags, etc., that may communicate with a base station, another device (for example, remote device), or some other entity. A wireless node may provide, for example, connectivity for or to a network (for example, a wide area network such as Internet or a cellular network) via a wired or wireless communication link. Some mobile devices may be considered Internet-of-Things (IoT) devices or may be implemented as NB-IoT (narrowband Internet of things) devices. A wireless device 120a-e may be included inside a housing that houses components of the wireless device, such as processor components, memory components, similar components, or a combination thereof.

In general, any number of communications systems and any number of wireless networks may be deployed in a given geographic area. Each communications system and wireless network may support a particular radio access technology (RAT) and may operate on one or more frequencies. A RAT also may be referred to as a radio technology, an air interface, etc. A frequency also may be referred to as a carrier, a frequency channel, etc. Each frequency may support a single RAT in a given geographic area in order to avoid interference between communications systems of different RATs. In some cases, NR or 5G RAT networks may be deployed.

Figure 2:
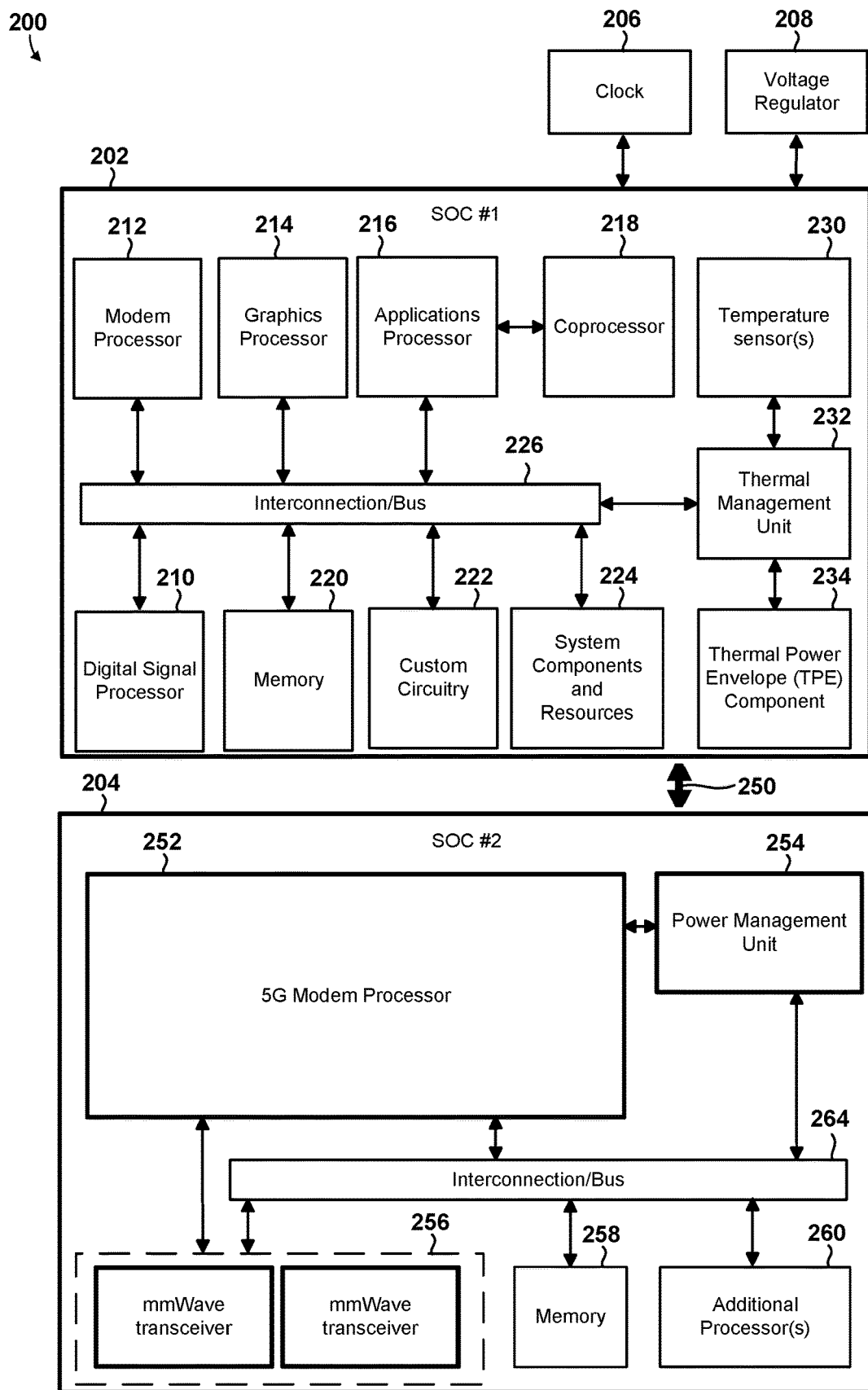
FIG. 2 is a component block diagram illustrating a computing system that may be configured to implement management of cell selection in accordance with various embodiments.

In some embodiments, two or more mobile devices 120a-e (for example, illustrated as the wireless device 120a and the wireless device 120e) may communicate directly using one or more sidelink channels 124 (for example, without using a base station 110a-110d as an intermediary to communicate with one another). For example, the wireless devices 120a-e may communicate using peer-to-peer (P2P) communications, device-to-device (D2D) communications, a vehicle-to-everything (V2X) protocol (which may include a vehicle-to-vehicle (V2V) protocol, a vehicle-to-infrastructure (V2I) protocol, or similar protocol), a mesh network, or similar networks, or combinations thereof In this case, the wireless device 120a-e may perform scheduling operations, resource selection operations, as well as other operations described elsewhere herein as being performed by the base station 110a Various embodiments may be implemented on a number of single processor and multiprocessor computer systems, including a system-on-chip (SOC) or system in a package (SIP). FIG. 2 illustrates an example computing system or SIP 200 architecture that may be used in wireless devices implementing the various embodiments.

With reference to FIGS. 1 and 2, the illustrated example SIP 200 includes a two SOCs 202, 204, a clock 206, and a voltage regulator 208. In some embodiments, the first SOC 202 may operate as the central processing unit (CPU) of the wireless device that carries out the instructions of software application programs by performing the arithmetic, logical, control and input/output (I/O) operations specified by the instructions. In some embodiments, the second SOC 204 may operate as a specialized processing unit. For example, the second SOC 204 may operate as a specialized 5G processing unit responsible for managing high volume, high speed (e.g., 5 Gbps, etc.), and/or very high frequency short wave length (e.g., 28 GHz mmWave spectrum, etc.) communications.

The first SOC 202 may include a digital signal processor (DSP) 210, a modem processor 212, a graphics processor 214, an application processor 216, one or more coprocessors 218 (e.g., vector co-processor) connected to one or more of the processors, memory 220, custom circuity 222, system components and resources 224, an interconnection/bus module 226, one or more temperature sensors 230, a thermal management unit 232, and a thermal power envelope (TPE) component 234. The second SOC 204 may include a 5G modem processor 252, a power management unit 254, an interconnection/bus module 264, a plurality of mmWave transceivers 256, memory 258, and various additional processors 260, such as an applications processor, packet processor, etc.

Each processor 210, 212, 214, 216, 218, 252, 260 may include one or more cores, and each processor/core may perform operations independent of the other processors/cores. For example, the first SOC 202 may include a processor that executes a first type of operating system (e.g., FreeBSD, LINUX, OS X, etc.) and a processor that executes a second type of operating system (e.g., MICROSOFT WINDOWS 10). In addition, any or all of the processors 210, 212, 214, 216, 218, 252, 260 may be included as part of a processor cluster architecture (e.g., a synchronous processor cluster architecture, an asynchronous or heterogeneous processor cluster architecture, etc.).

The first and second SOC 202, 204 may include various system components, resources and custom circuitry for managing sensor data, analog-to-digital conversions, wireless data transmissions, and for performing other specialized operations, such as decoding data packets and processing encoded audio and video signals for rendering in a web browser. For example, the system components and resources 224 of the first SOC 202 may include power amplifiers, voltage regulators, oscillators, phase-locked loops, peripheral bridges, data controllers, memory controllers, system controllers, access ports, timers, and other similar components used to support the processors and software clients running on a wireless device. The system components and resources 224 and/or custom circuitry 222 may also include circuitry to interface with peripheral devices, such as cameras, electronic displays, wireless communication devices, external memory chips, etc.

The first and second SOC 202, 204 may communicate via interconnection/bus module 250. The various processors 210, 212, 214, 216, 218, may be interconnected to one or more memory elements 220, system components and resources 224, and custom circuitry 222, and a thermal management unit 232 via an interconnection/bus module 226. Similarly, the processor 252 may be interconnected to the power management unit 254, the mmWave transceivers 256, memory 258, and various additional processors 260 via the interconnection/bus module 264. The interconnection/bus module 226, 250, 264 may include an array of reconfigurable logic gates and/or implement a bus architecture (e.g., CoreConnect, AMBA, etc.). Communications may be provided by advanced interconnects, such as high-performance networks-on chip (NoCs).

The first and/or second SOCs 202, 204 may further include an input/output module (not illustrated) for communicating with resources external to the SOC, such as a clock 206 and a voltage regulator 208. Resources external to the SOC (e.g., clock 206, voltage regulator 208) may be shared by two or more of the internal SOC processors/cores.

In addition to the example SIP 200 discussed above, various embodiments may be implemented in a wide variety of computing systems, which may include a single processor, multiple processors, multicore processors, or any combination thereof.

Figure 3:
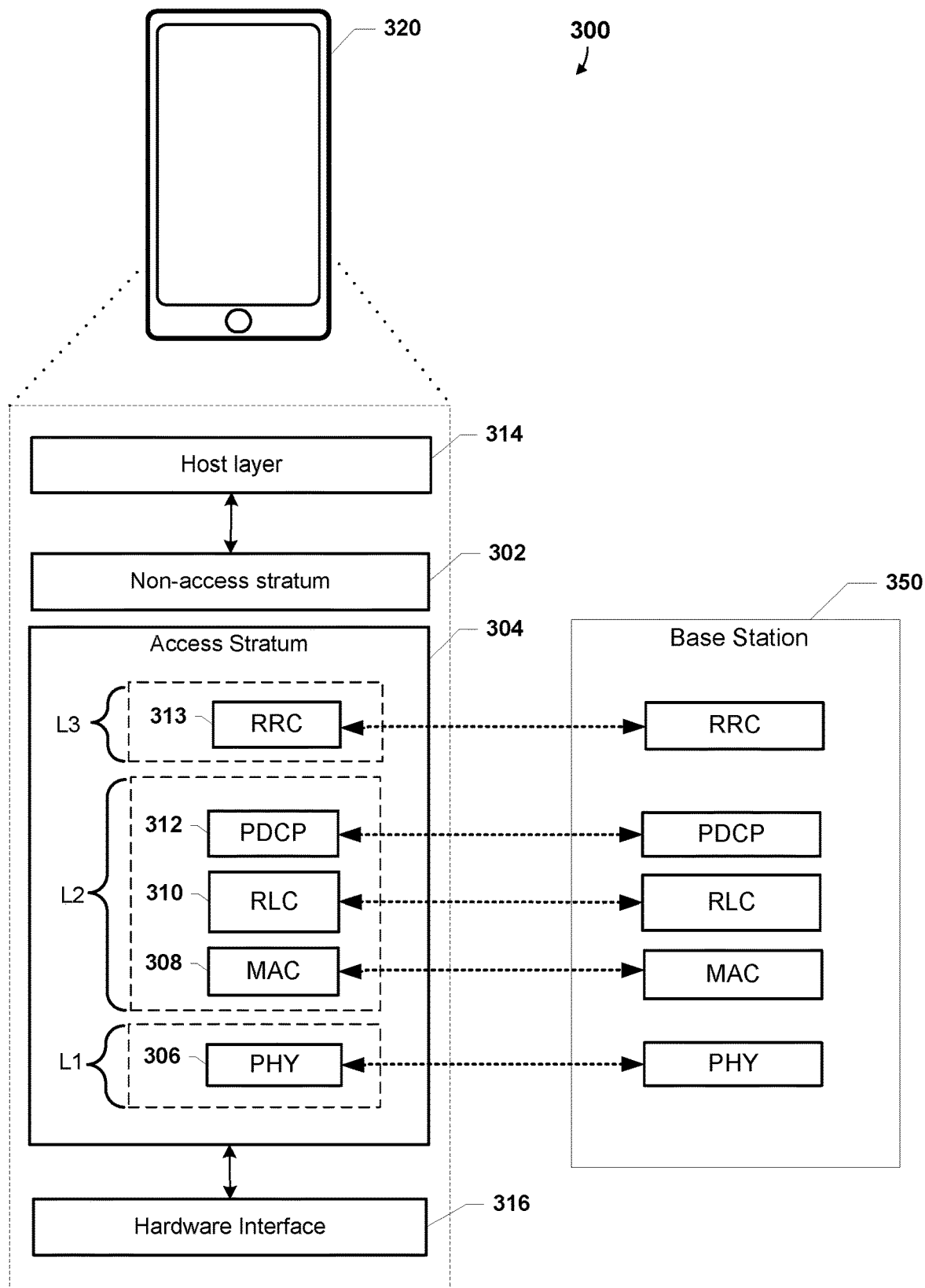
FIG. 3 is a diagram illustrating an example of a software architecture including a radio protocol stack for the user and control planes in wireless communications in accordance with various embodiments.

FIG. 3 illustrates an example of a software architecture 300 including a radio protocol stack for the user and control planes in wireless communications between a base station 350 (e.g., the base station 110a) and a wireless device 320 (e.g., the wireless device 120a-120e, 200). With reference to FIGS. 1-3, the wireless device 320 may implement the software architecture 300 to communicate with the base station 350 of a communication system (e.g., 100). In various embodiments, layers in software architecture 300 may form logical connections with corresponding layers in software of the base station 350. The software architecture 300 may be distributed among one or more processors (e.g., the processors 212, 214, 216, 218, 252, 260). While illustrated with respect to one radio protocol stack, in a multi-SIM (subscriber identity module) wireless device, the software architecture 300 may include multiple protocol stacks, each of which may be associated with a different subscriber identification module (SIM)(e.g., two protocol stacks associated with two SIMs, respectively, in a dual-SIM wireless communication device). While described below with reference to LTE communication layers, the software architecture 300 may support any of variety of standards and protocols for wireless communications, and/or may include additional protocol stacks that support any of variety of standards and protocols wireless communications.

The software architecture 300 may include a Non-Access Stratum (NAS) 302 and an Access Stratum (AS) 304. The NAS 302 may include functions and protocols to support packet filtering, security management, mobility control, session management, and traffic and signaling between a SIM(s) of the wireless device (e.g., SIM(s) 204) and its core network 140. The AS 304 may include functions and protocols that support communication between a SIM(s) (e.g., SIM(s) 204) and entities of supported access networks (e.g., a base station). In particular, the AS 304 may include at least three layers (Layer 1, Layer 2, and Layer 3), each of which may contain various sub-layers.

In the user and control planes, Layer 1 (L1) of the AS 304 may be a physical layer (PHY) 306, which may oversee functions that enable transmission and/or reception over the air interface. Examples of such physical layer 306 functions may include cyclic redundancy check (CRC) attachment, coding blocks, scrambling and descrambling, modulation and demodulation, signal measurements, MIMO, etc. The physical layer may include various logical channels, including the Physical Downlink Control Channel (PDCCH) and the Physical Downlink Shared Channel (PDSCH).

In the user and control planes, Layer 2 (L2) of the AS 304 may be responsible for the link between the wireless device 320 and the base station 350 over the physical layer 306. In the various embodiments, Layer 2 may include a media access control (MAC) sublayer 308, a radio link control (RLC) sublayer 310, and a packet data convergence protocol (PDCP) 312 sublayer, each of which form logical connections terminating at the base station 350.

In the control plane, Layer 3 (L3) of the AS 304 may include a radio resource control (RRC) sublayer 3. While not shown, the software architecture 300 may include additional Layer 3 sublayers, as well as various upper layers above Layer 3. In various embodiments, the RRC sublayer 313 may provide functions INCLUDING broadcasting system information, paging, and establishing and releasing an RRC signaling connection between the wireless device 320 and the base station 350.

In various embodiments, the PDCP sublayer 312 may provide uplink functions including multiplexing between different radio bearers and logical channels, sequence number addition, handover data handling, integrity protection, ciphering, and header compression. In the downlink, the PDCP sublayer 312 may provide functions that include in-sequence delivery of data packets, duplicate data packet detection, integrity validation, deciphering, and header decompression.

In the uplink, the RLC sublayer 310 may provide segmentation and concatenation of upper layer data packets, retransmission of lost data packets, and Automatic Repeat Request (ARQ). In the downlink, while the RLC sublayer 310 functions may include reordering of data packets to compensate for out-of-order reception, reassembly of upper layer data packets, and ARQ.

In the uplink, MAC sublayer 308 may provide functions including multiplexing between logical and transport channels, random access procedure, logical channel priority, and hybrid-ARQ (HARQ) operations. In the downlink, the MAC layer functions may include channel mapping within a cell, de-multiplexing, discontinuous reception (DRX), and HARQ operations.

While the software architecture 300 may provide functions to transmit data through physical media, the software architecture 300 may further include at least one host layer 314 to provide data transfer services to various applications in the wireless device 320. In some embodiments, application-specific functions provided by the at least one host layer 314 may provide an interface between the software architecture and the general purpose processor 206.

In other embodiments, the software architecture 300 may include one or more higher logical layer (e.g., transport, session, presentation, application, etc.) that provide host layer functions. For example, in some embodiments, the software architecture 300 may include a network layer (e.g., IP layer) in which a logical connection terminates at a packet data network (PDN) gateway (PGW). In some embodiments, the software architecture 300 may include an application layer in which a logical connection terminates at another device (e.g., end user device, server, etc.). In some embodiments, the software architecture 300 may further include in the AS 304 a hardware interface 316 between the physical layer 306 and the communication hardware (e.g., one or more radio frequency (RF) transceivers).

Figure 4:
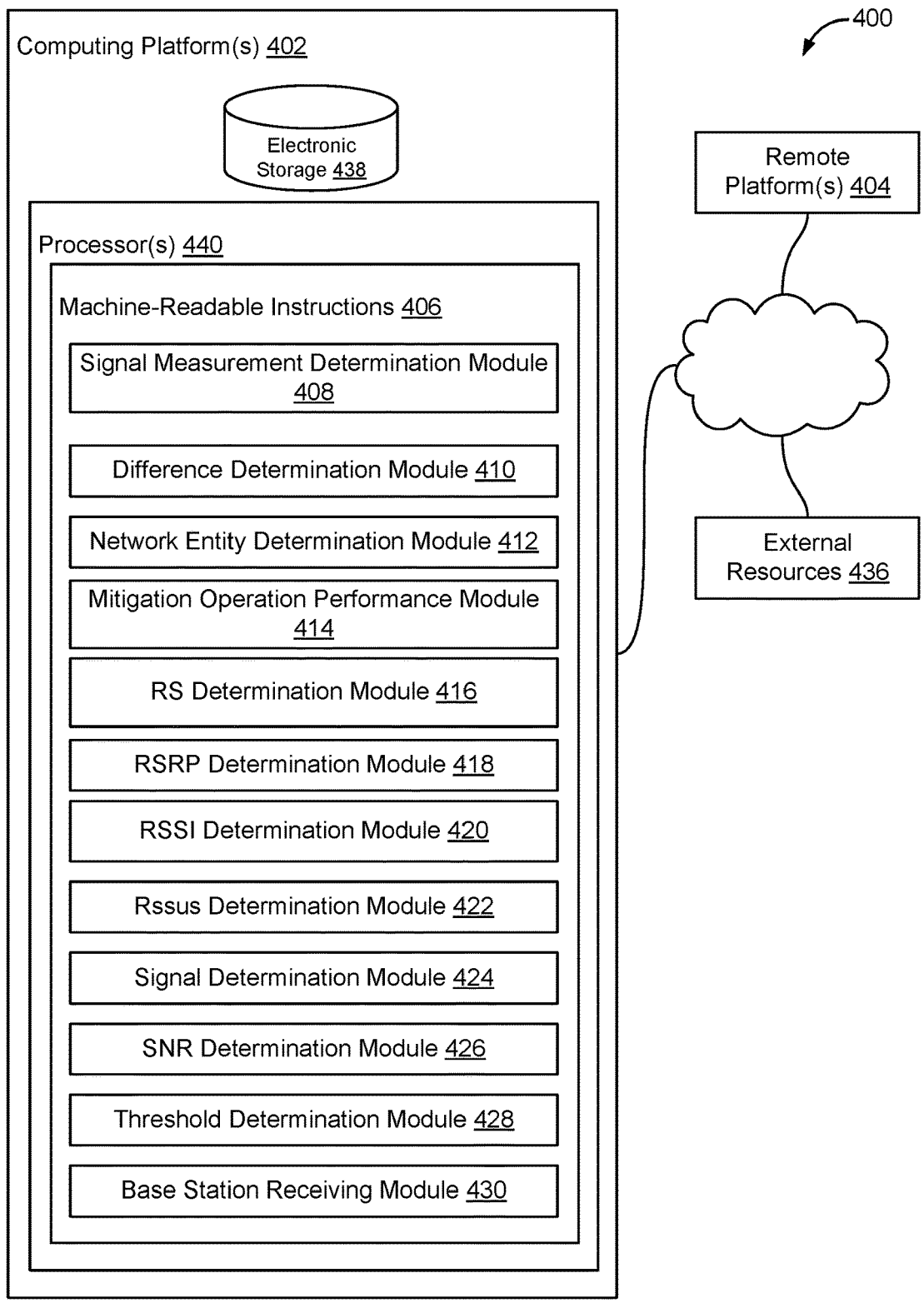
FIG. 4 is a component block diagram illustrating a system configured implemented by a processor in a wireless device for detecting the presence in a network of a jammer or non-benign entity that targets physical layer channels in a communication network in accordance with various embodiments.

FIG. 4 is a component block diagram illustrating a system 400 configured implemented by a processor in a wireless device for detecting the presence in a network of a jammer or non-benign entity that targets physical layer channels in a communication network in accordance with various embodiments. In some embodiments, system 400 may include one or more computing platforms 402 and/or one or more remote platforms 404. With reference to FIGS. 1-4, computing platform(s) 402 may include a base station (e.g., the base station 110, 350) and/or a wireless device (e.g., the wireless device 120a-120e, 200, 320). Remote platform(s) 404 may include a base station (e.g., the base station 110, 350) and/or a wireless device (e.g., the wireless device 120a-120e, 200, 320).

Computing platform(s) 402 may be configured by machine-readable instructions 406. Machine-readable instructions 406 may include one or more instruction modules. The instruction modules may include computer program modules. The instruction modules may include one or more of signal measurement determination module 408, difference determination module 410, network entity determination module 412, mitigation operation performance module 414, reference signal determination module 416, RSRP determination module 418, radio signal strength indicator (RSSI) determination module 420, Non-demodulation RSSI determination module 422, signal determination module 424, SNR determination module 426, threshold determination module 428, base station receiving module 430, value sending module 432, value correspond sending module 434, and/or other instruction modules.

Signal measurement determination module 408 may be configured to determine a first signal measurement based on a first physical layer communication.

Signal measurement determination module 408 may be configured to determine a second signal measurement based on a second physical layer communication.

Difference determination module 410 may be configured to determine a difference between the first signal measurement and the second signal measurement quantity.

Difference determination module 410 may be configured to determine whether the difference between the first signal measurement and the second signal measurement satisfies a threshold.

Difference determination module 410 may be configured to determine the difference between the RSRP of the SSB and the RSRP of the CSI-RS.

Difference determination module 410 may be configured to determine the difference between the RSSI of the DMRS associated with the PDCCH and the RSSI of the non-DMRS associated with the PDCCH.

Difference determination module 410 may be configured to determine the difference between the normalized SNR of the DMRS associated with the PDCCH and the normalized SNR of the non-DMRS associated with the PDCCH.

Difference determination module 410 may be configured to determine the difference between the RSSI of the PDCCH and the RSSI of the PDSCH.

Difference determination module 410 may be configured to determine the difference between the RSSI of the DMRS associated with the PDSCH and the RSSI of the non-DMRS associated with the PDSCH.

Difference determination module 410 may be configured to determine the difference between the normalized SNR of the DMRS associated with the PDSCH and the normalized SNR of the non-DMRS associated with the PDSCH.

Difference determination module 410 may be configured to determine the difference between the RSSI of the RS and the RSRP of the RSSI.

Network entity determination module 412 may be configured to determine whether a jammer or non-benign entity is present in the network in response to determining that the difference between the first signal measurement and the second signal measurement satisfies the threshold.

Mitigation operation performance module 414 may be configured to perform a mitigation operation in response to determining that the network entity is non-benign.

Reference signal determination module 416 may be configured to determine a reference signal receive power based on a synchronization signal block.

Reference signal determination module 416 may be configured to determine a reference signal receive power based on the RS.

RSRP determination module 418 may be configured to determine an RSRP based on a channel state information reference signal.

Demodulation-based RSSI determination module 420 may be configured to determine a radio signal strength indicator (RSSI) based on a demodulation reference signal associated with a physical downlink control channel, based on a physical downlink control channel, based on a demodulation reference signal associated with a physical downlink shared channel, and/or based on a reference signal.

Non-demodulation RSSI determination module 422 may be configured to determine an RSSI based on a non-demodulation reference signal associated with the PDCCH, a physical downlink shared channel, and/or a non-demodulation reference signal associated with the PDSCH.

Signal determination module 424 may be configured to determine a normalized signal to noise ratio based on a demodulation reference signal associated with a physical downlink control channel.

Signal determination module 424 may be configured to determine a normalized signal to noise ratio based on a demodulation reference signal associated with a physical downlink shared channel.

SNR determination module 426 may be configured to determine a normalized SNR based on a non-demodulation reference signal associated with the PDCCH and/or to determine a normalized SNR based on a non-demodulation reference signal associated with the PDSCH.

Threshold determination module 428 may be configured to determine the threshold based on a difference between a transmit power of the first physical layer communication and a transmit power of the second physical layer communication. Alternatively or additionally, threshold determination module 428 may be configured to determine the threshold based on the relationship between a transmit power of the first physical layer communication and a transmit power of the second physical layer communication.

Base station receiving module 430 may be configured to receive from a base station a value identifying a relationship between a transmit power of the first physical layer communication and a transmit power of the second physical layer communication. Alternatively or additionally, the base station receiving module 430 may be configured to receive from a base station at least one Quasi Co-location value corresponding to at least one of the first signal measurement or the second signal measurement.

FIGS. 5A, 5B, 5C, 5D, 5E, 5F, 5G, 5H, 5I, 5J, and/or 5K illustrate(s) operations of method 500 for detecting the presence in a network of a jammer or non-benign entity that targets physical layer channels in a communication network in accordance with various embodiments. The operations of the method 500 presented below are intended to be illustrative. In some embodiments, the method 500 may be accomplished with one or more additional operations not described, and/or without one or more of the operations discussed. Additionally, the order in which the operations of the method 500 are illustrated in FIGS. 5A, 5B, 5C, 5D, 5E, 5F, 5G, 5H, 5I, 5J, and/or 5K and described below is not intended to be limiting.

In some embodiments, the method 500 may be implemented in one or more processors (e.g., a digital processor, an analog processor, a digital circuit designed to process information, an analog circuit designed to process information, a state machine, and/or other mechanisms for electronically processing information). The one or more processors may include one or more devices executing some or all of the operations of the method 500 in response to instructions stored electronically on an electronic storage medium. The one or more processors may include one or more devices configured through hardware, firmware, and/or software to be specifically designed for execution of one or more of the operations of method 500. For example, with reference to FIGS. 1-5A, 5B, 5C, 5D, 5E, 5F, 5G, 5H, 5I, 5J, and/or 5K, the operations 500 may be performed by a processor of a base station (e.g., the base station 110, 350) and/or a wireless device (e.g., the wireless device 120a-120e, 200, 320).

Figure 5A:
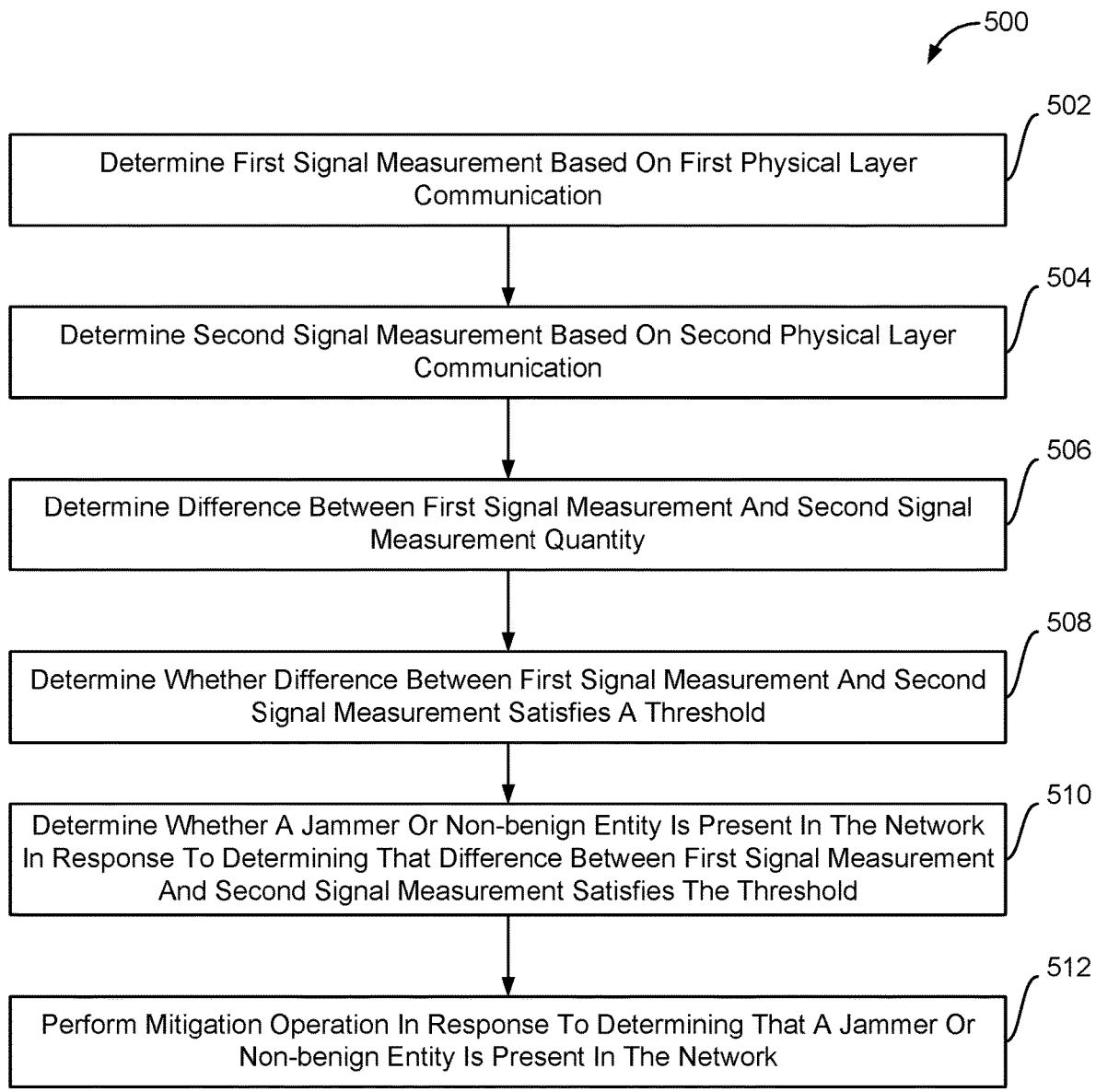
FIGS. 5A, 5B, 5C, 5D, 5E, 5F, 5G, 5H, 5I, 5J, and/or 5K illustrate(s) operations of methods implemented by a processor in a wireless device for detecting the presence in a network of a jammer or non-benign entity that targets physical layer channels in a communication network in accordance with various embodiments.

FIG. 5A illustrates operations that may be performed as part of the operations of blocks 502-506 of the method 500, in accordance with one or more embodiments. The operations of method 500 may be performed by a processor in a wireless device for detecting the presence in a network of a jammer or non-benign entity that targets physical layer channels in a communication network.

In block 502, the wireless device processor may determine a first signal measurement based on a first physical layer communication. For example, in block 502, the wireless device processor may measure or collect a reference signal receive power (RSRP) measurement, a radio signal strength indicator (RSSI) measurement or a signal to noise ratio (SNR) based on a synchronization signal block (SSB), a channel state information reference signal (CSI-RS), a physical downlink control channel (PDCCH), a demodulation reference signal (DMRS) associated with the PDCCH, a non-demodulation reference signal (non-DMRS) associated with the PDCCH, a physical downlink shared channel (PDSCH), a DMRS associated with the PDSCH, a non-DMRS associated with the PDSCH, and/or a reference signal (RS) resource element.

In block 504, the wireless device processor may determine a second signal measurement based on a second physical layer communication. The second physical layer communication may be the same type or a different type of physical layer communication as the first physical layer communication. For example, in some embodiments, the first physical layer communication may be an SSB communication and the second physical layer communication may be a CSI-RS communication. As another example, in some embodiments, both the first and second physical layer communications may be PDCCH (or PDSCH, RS, etc.) communications. Similarly, the second signal measurement determined in block 504 may be the same or different signal measurement as the first signal measurement determined in block 502. For example, in some embodiments, the first signal measurement may be an RSRP measurement and the second signal measurement may be an RSSI measurement. As another example, both the first and second signal measurements may be RSRP measurements.

In block 506, the wireless device processor may determine a difference between the first signal measurement and the second signal measurement quantity. For example, wireless device processor may determine that the difference between the SSB RSRP (first signal measurement) and the CSI-RS RSRP (second signal measurement) is 10 decibels.

In block 508, the wireless device processor may determine whether the difference between the first signal measurement and the second signal measurement satisfies a threshold (e.g., is greater than a threshold value, or is greater than or equal to a threshold value, such as, 3 decibels, 10 decibels, etc.). In some embodiments, the wireless device processor may determine the threshold value based on a difference between a transmit power of the first physical layer communication and a transmit power of the second physical layer communication. In some embodiments, the wireless device processor may determine the threshold value based on information received from the base station.

In block 510, the wireless device processor may determine whether a jammer or non-benign entity is present in the network in response to determining that the difference between the first signal measurement and the second signal measurement satisfies the threshold. For example, the wireless device processor may determine that a jammer or non-benign entity is present in the network in response to determining that the difference between the SSB RSRP (first signal measurement) and the CSI-RS RSRP (second signal measurement) is greater than 10 decibels, is greater than or equal to 10 decibels, etc.

In block 512, the wireless device processor may perform a mitigation operation in response to determining that the network entity is non-benign. For example, the wireless device processor may report the activities of the network entity to a security server of the communication network, or update one or more communication parameters to access the communication network using a different frequency, band or system.

Figure 5B:
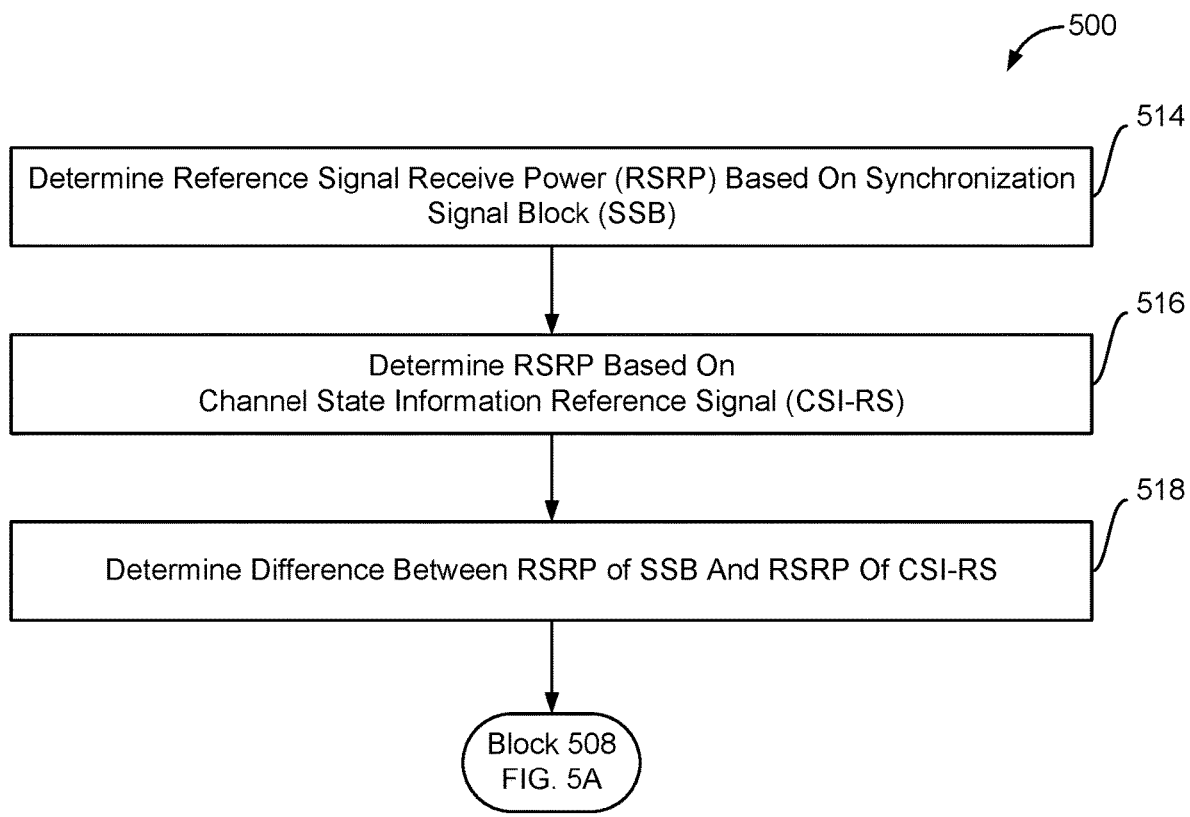

FIG. 5B illustrates operations that may be performed as part of the operations of blocks 502-506 of the method 500, in accordance with one or more embodiments.

In block 514, the wireless device processor may determine a reference signal receive power (RSRP) based on a synchronization signal block (SSB).

In block 516, the wireless device processor may determine an RSRP based on a channel state information reference signal (CSI-RS).

In block 518, the wireless device processor may determine the difference between the RSRP of the SSB (or SSB RSRP) and the RSRP of the CSI-RS (or CSI-RS RSRP). The processor may then perform the operations of block 508-512 of the method 500 (FIG. 5A) as described.

Figure 5C:
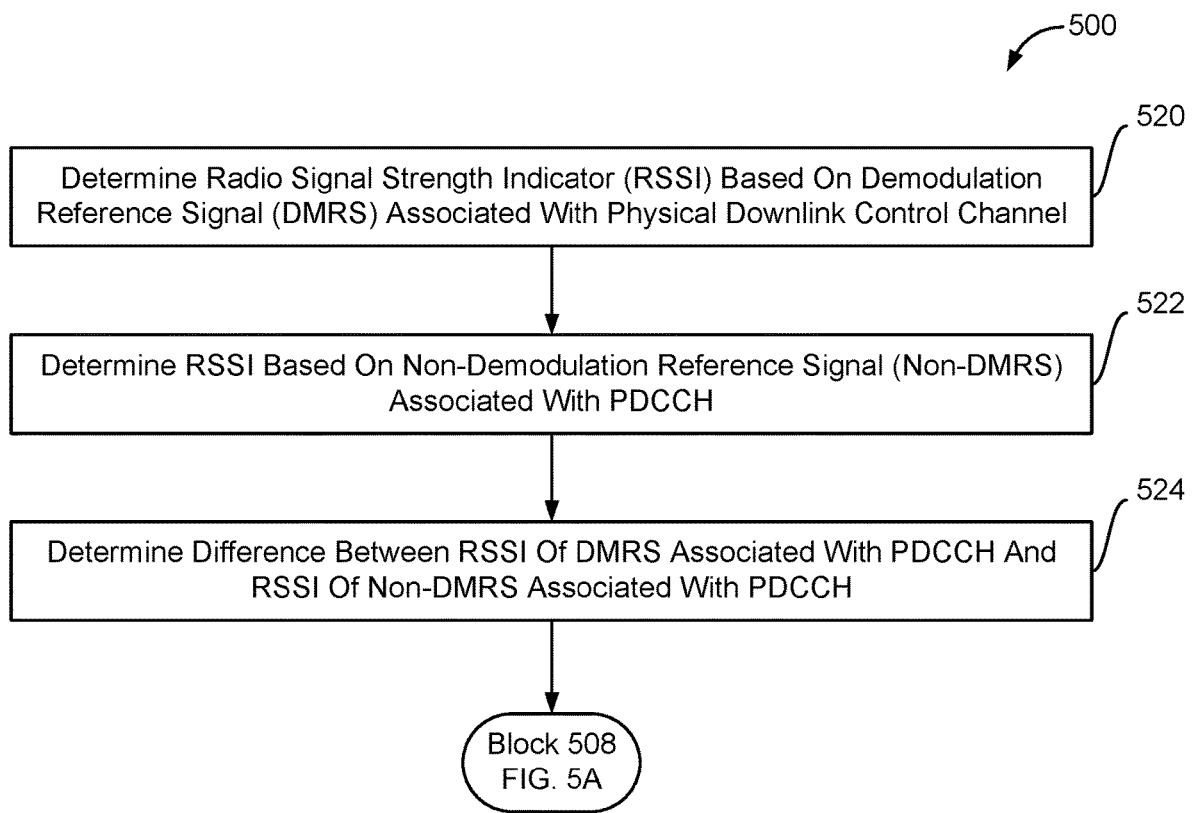

FIG. 5C illustrates operations that may be performed as part of the operations of blocks 502-506 of the method 500, in accordance with one or more embodiments. In block 520, the wireless device processor may determine a radio signal strength indicator (RSSI) based on a demodulation reference signal (DMRS) associated with a physical downlink control channel (PDCCH). In block 522, the wireless device processor may determine an RSSI based on a non-demodulation reference signal (non-DMRS) associated with the PDCCH.

In block 524, the wireless device processor may determine the difference between the RSSI of the DMRS associated with the PDCCH (or PDCCH DMRS RSSI) and the RSSI of the non-DMRS associated with the PDCCH (or PDCCH non-DMRS RSSI). The processor may then perform the operations of block 508-512 of the method 500 (FIG. 5A) as described.

Figure 5D:
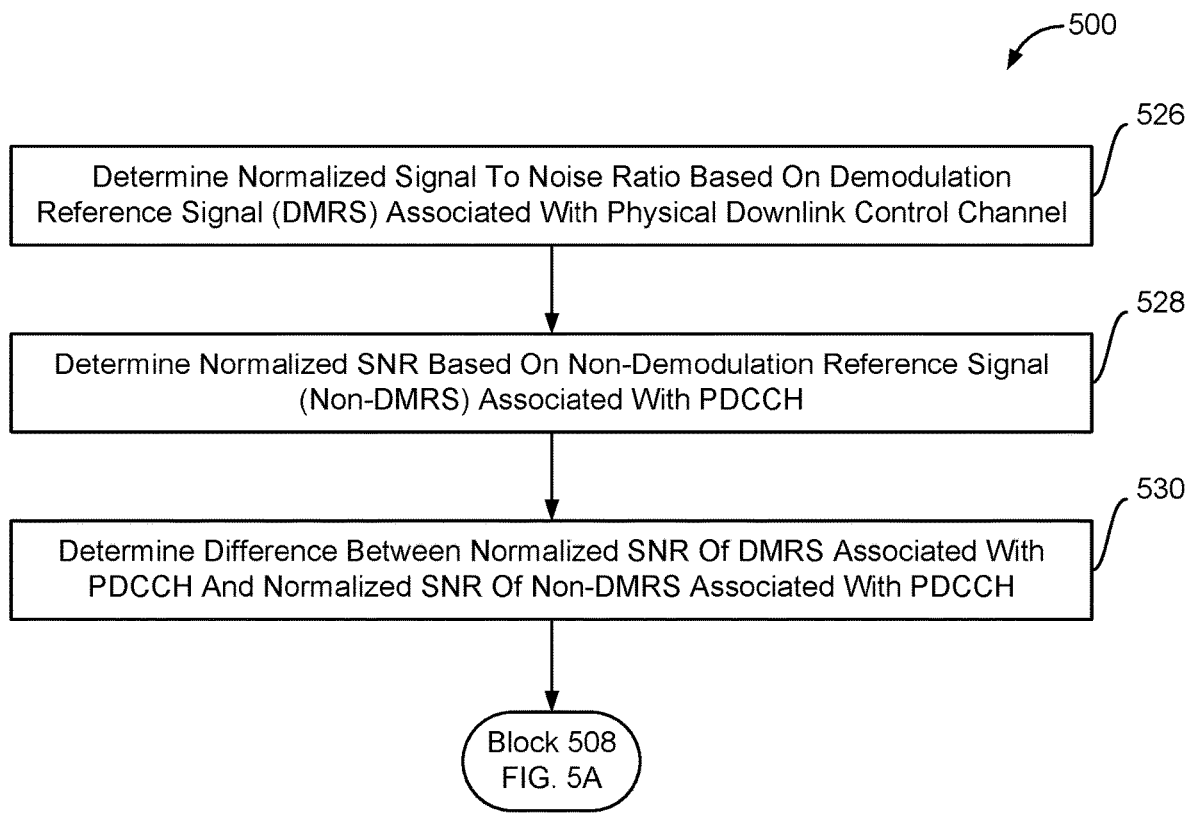

FIG. 5D illustrates operations that may be performed as part of the operations of blocks 502-506 of the method 500, in accordance with one or more embodiments. In block 526, the wireless device processor may determine a normalized signal to noise ratio (SNR) based on a demodulation reference signal (DMRS) associated with a physical downlink control channel (PDCCH).

In block 528, the wireless device processor may determine a normalized SNR based on a non-demodulation reference signal (non-DMRS) associated with the PDCCH.

In block 530, the wireless device processor may determine the difference between the normalized SNR of the DMRS associated with the PDCCH (or PDCCH DMRS SNR) and the normalized SNR of the non-DMRS associated with the PDCCH (or PDCCH non-DMRS SNR). The processor may then perform the operations of block 508-512 of the method 500 (FIG. 5A) as described.

Figure 5E:
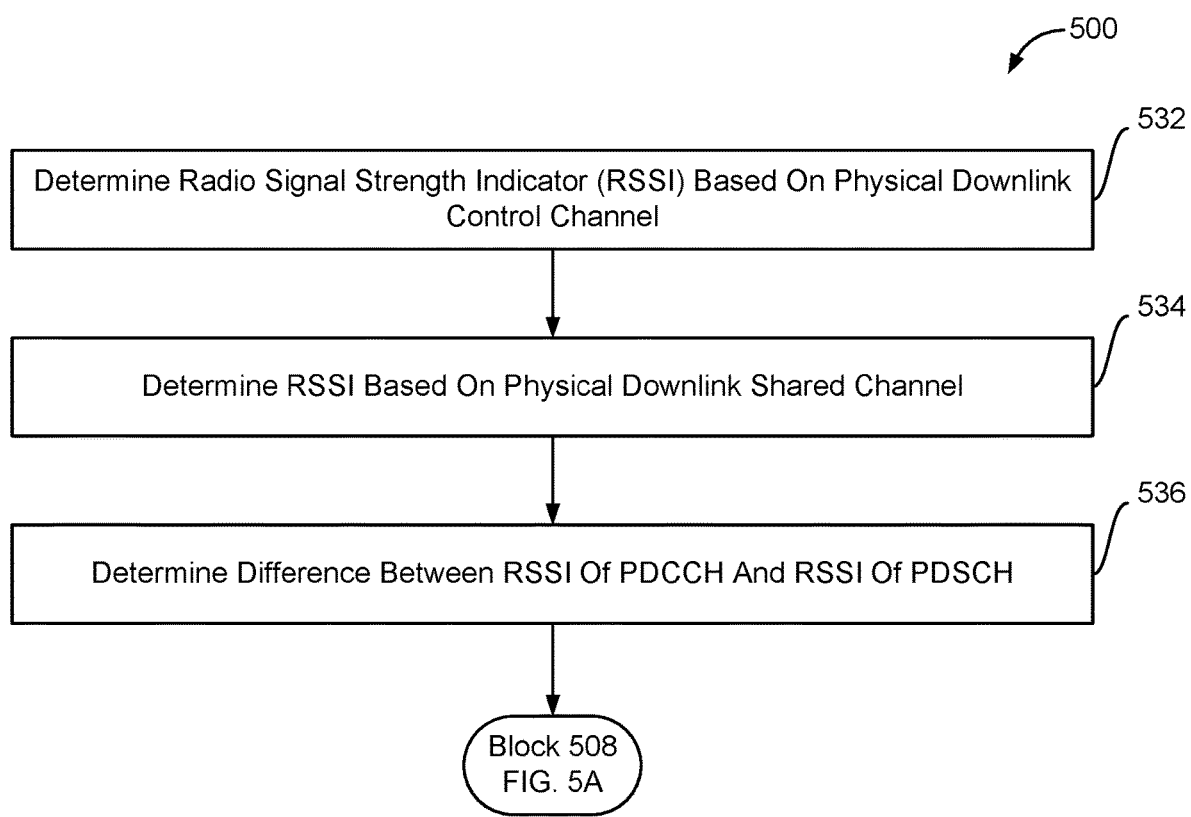

FIG. 5E illustrates operations that may be performed as part of the operations of blocks 502-506 of the method 500, in accordance with one or more embodiments. In block 532, the wireless device processor may determine a radio signal strength indicator (RSSI) based on a physical downlink control channel (PDCCH).

In block 534, the wireless device processor may determine an RSSI based on a physical downlink shared channel (PDSCH).

In block 536, the wireless device processor may determine the difference between the RSSI of the PDCCH (or PDCCH RSSI) and the RSSI of the PDSCH (or PDSCH RSSI). The processor may then perform the operations of block 508-512 of the method 500 (FIG. 5A) as described.

Figure 5F:
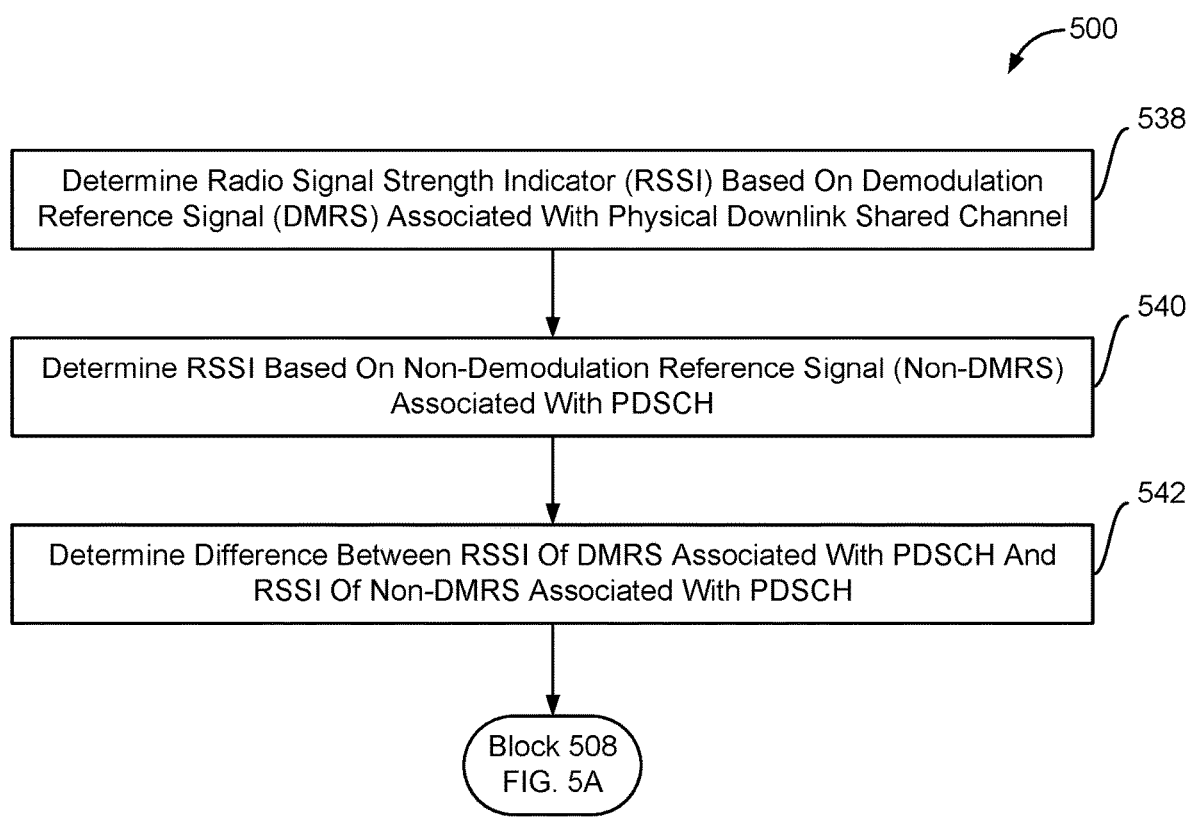

FIG. 5F illustrates operations that may be performed as part of the operations of blocks 502-506 of the method 500, in accordance with one or more embodiments. In block 538, the wireless device processor may determine a radio signal strength indicator (RSSI) based on a demodulation reference signal (DMRS) associated with a physical downlink shared channel (PDCCH).

In block 540, the wireless device processor may determine an RSSI based on a non-demodulation reference signal (non-DMRS) associated with the PDSCH.

In block 542, the wireless device processor may determine the difference between the RSSI of the DMRS associated with the PDSCH (or PDSCH DMRS RSSI) and the RSSI of the non-DMRS associated with the PDSCH (or PDSCH non-DMRS RSSI). The processor may then perform the operations of block 508-512 of the method 500 (FIG. 5A) as described.

Figure 5G:
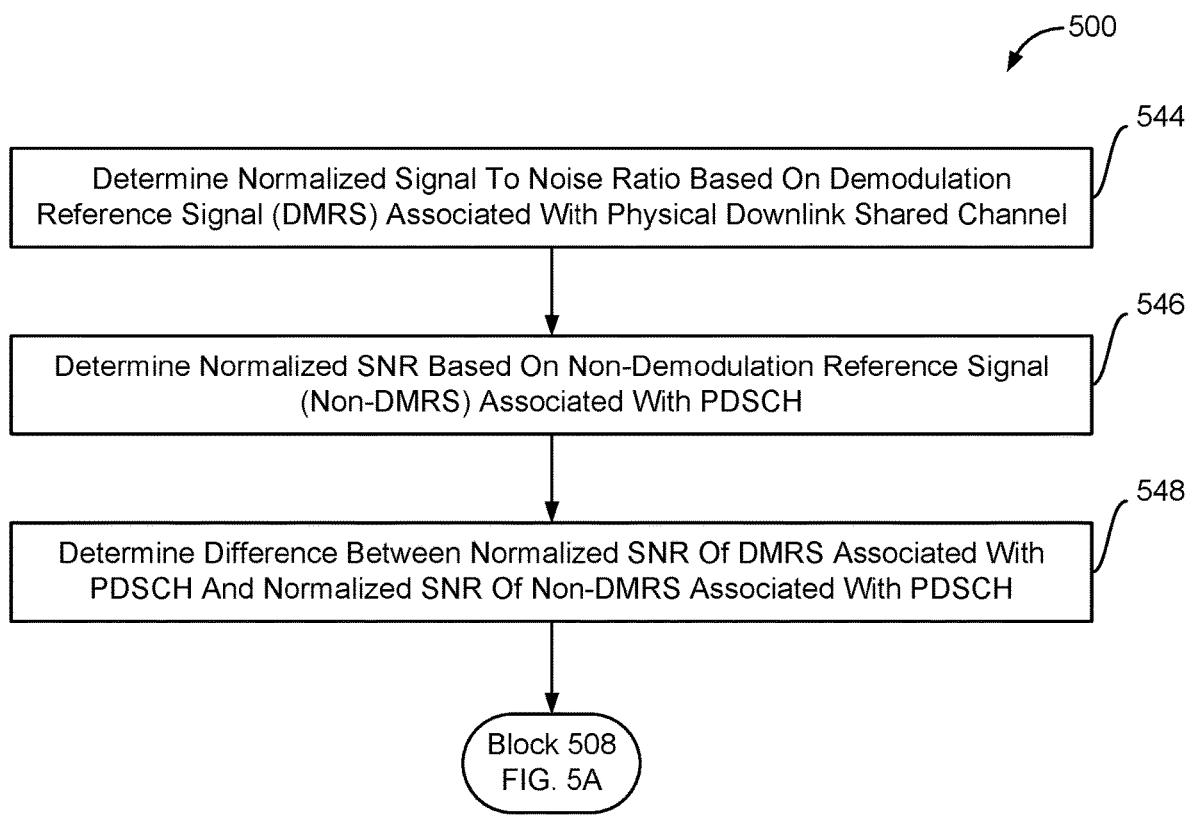

FIG. 5G illustrates operations that may be performed as part of the operations of blocks 502-506 of the method 500, in accordance with one or more embodiments. In block 544, the wireless device processor may determine a normalized signal to noise ratio (SNR) based on a demodulation reference signal (DMRS) associated with a physical downlink shared channel (PDCCH).

In block 546, the wireless device processor may determine a normalized SNR based on a non-demodulation reference signal (non-DMRS) associated with the PDSCH.

In block 548, the wireless device processor may determine the difference between the normalized SNR of the DMRS associated with the PDSCH (or PDSCH DMRS SNR) and the normalized SNR of the non-DMRS associated with the PDSCH (or PDSCH non-DMRS SNR). The processor may then perform the operations of block 508-512 of the method 500 (FIG. 5A) as described.

Figure 5H:
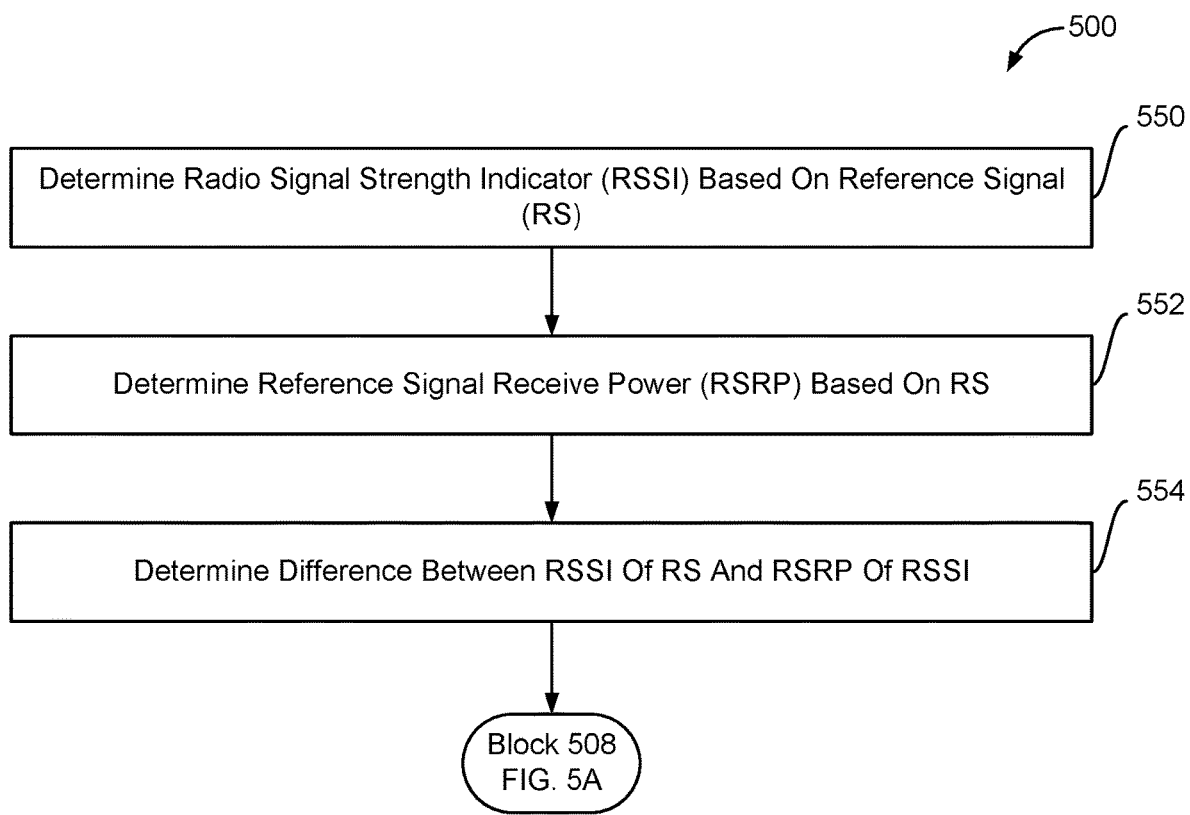

FIG. 5H illustrates operations that may be performed as part of the operations of blocks 502-506 of the method 500, in accordance with one or more embodiments. In block 550, the wireless device processor may determine a radio signal strength indicator (RSSI) based on a reference signal (RS) resource element.

In block 552, the wireless device processor may determine a reference signal receive power based on the RS resource element.

In block 554, the wireless device processor may determine the difference between the RSSI of the RS (or RS RSSI) and the RSRP of the RS (or RS RSRP). The processor may then perform the operations of block 508-512 of the method 500 (FIG. 5A) as described.

Figure 5I:
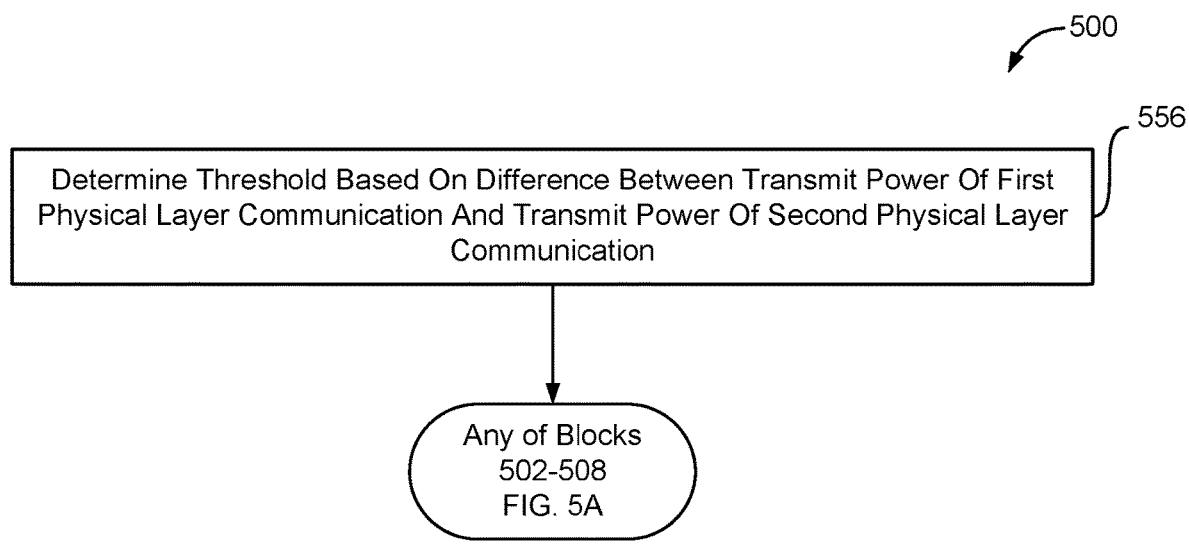

FIG. 5I illustrates operations that may be performed before or as part of the operations in any of blocks 502-508 of the method 500, in accordance with one or more embodiments. In block 556, the wireless device processor may determine the threshold based on a difference between a transmit power of the first physical layer communication and a transmit power of the second physical layer communication. The processor may then perform the operations of any of blocks 502-508 of the method 500 (FIG. 5A) as described.

Figure 5J:
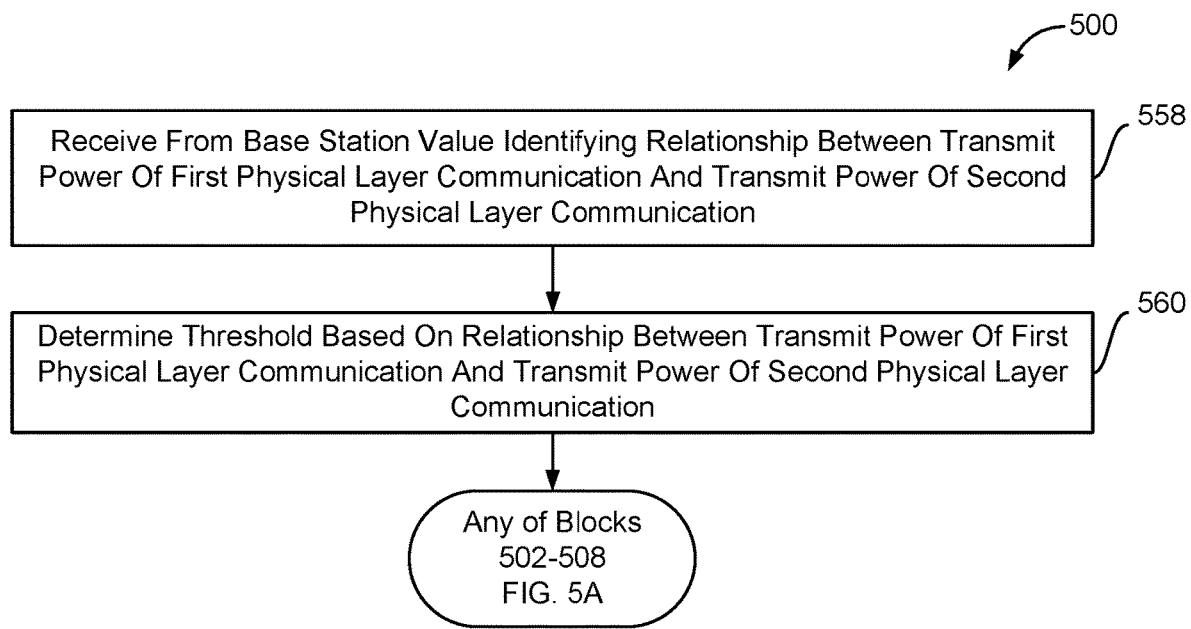

FIG. 5J illustrates operations that may be performed before or as part of the operations in any of blocks 502-508 of the method 500, in accordance with one or more embodiments. In block 558, the wireless device processor may perform operations including receiving from a base station a value identifying a relationship between a transmit power of the first physical layer communication and a transmit power of the second physical layer communication.

In block 560, the wireless device processor may determine the threshold based on the relationship between the transmit power of the first physical layer communication and the transmit power of the second physical layer communication. The processor may then perform the operations of any of blocks 502-508 of the method 500 (FIG. 5A) as described.

Figure 5K:
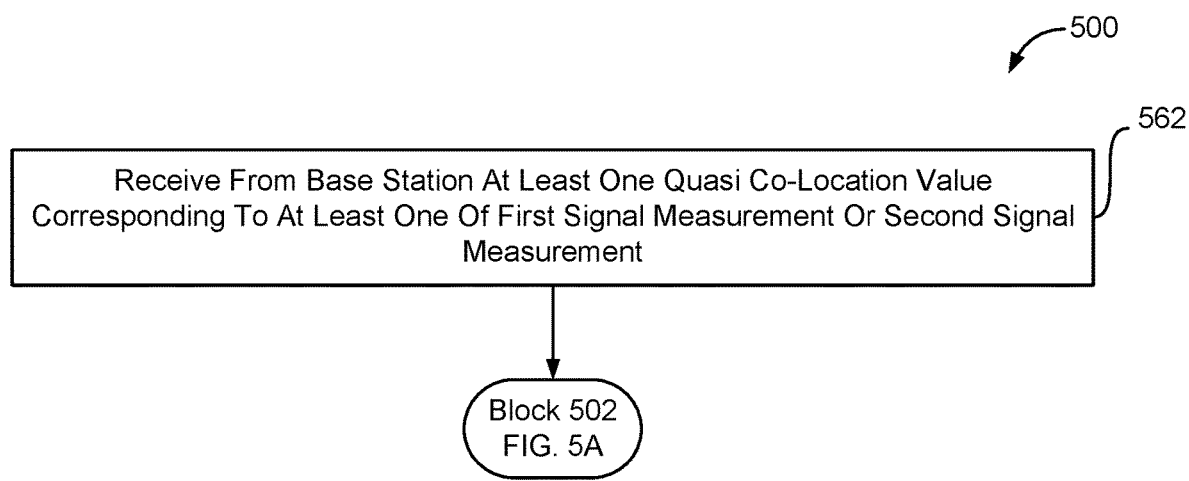

FIG. 5K illustrates operations that may be performed as part of the operations in of the method 500 in accordance with one or more embodiments. In block 562, the wireless device processor may receive from a base station at least one Quasi Co-location (QCL) value corresponding to at least one of the first signal measurement or the second signal measurement. The wireless device may use the QCL value to determine the signal measurements (e.g., RSSI, SNR, etc.) and/or the physical layer communications (e.g., SSB, PDCCH, etc.) that may be evaluated in blocks 502 and 504 of FIG. 5A.

Figure 6:
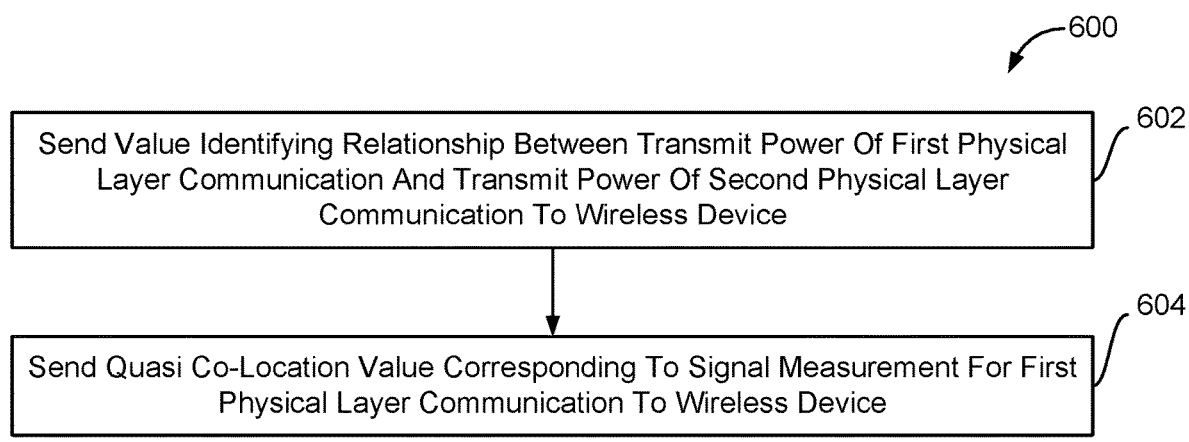
FIG. 6 illustrates operations of methods implemented by a processor in a base station for detecting the presence in a network of a jammer or non-benign entity that targets physical layer channels in a communication network in accordance with various embodiments.

FIG. 6 illustrates a method 600 that may be implemented by a processor in a base station to enable wireless devices to detect the presence in a network of a jammer or non-benign entity that targets physical layer channels in a communication network in accordance with one or more embodiments. In block 602, the base station processor may send a value identifying a relationship between a transmit power of a first physical layer communication and a transmit power of a second physical layer communication to the wireless device. For example, the network processor may send a value that indicates that the transmit power of a first physical layer communication should be approximately the same as the transmit power of a second physical layer communication. In this example, a wireless device may receive this information, and determine that the threshold value should be 3 decibels to account for normal or expected variations between the first and second physical layer communications.

In block 604, the base station processor may send a Quasi Co-location value corresponding to a signal measurement for a first physical layer communication to the wireless device. The wireless device may use the QCL value to determine the signal measurements (e.g., RSSI, SNR, etc.) and/or the physical layer communications (e.g., SSB, PDCCH, etc.) that should be evaluated in blocks 502 and 504 of FIG. 5A.

Figure 7:
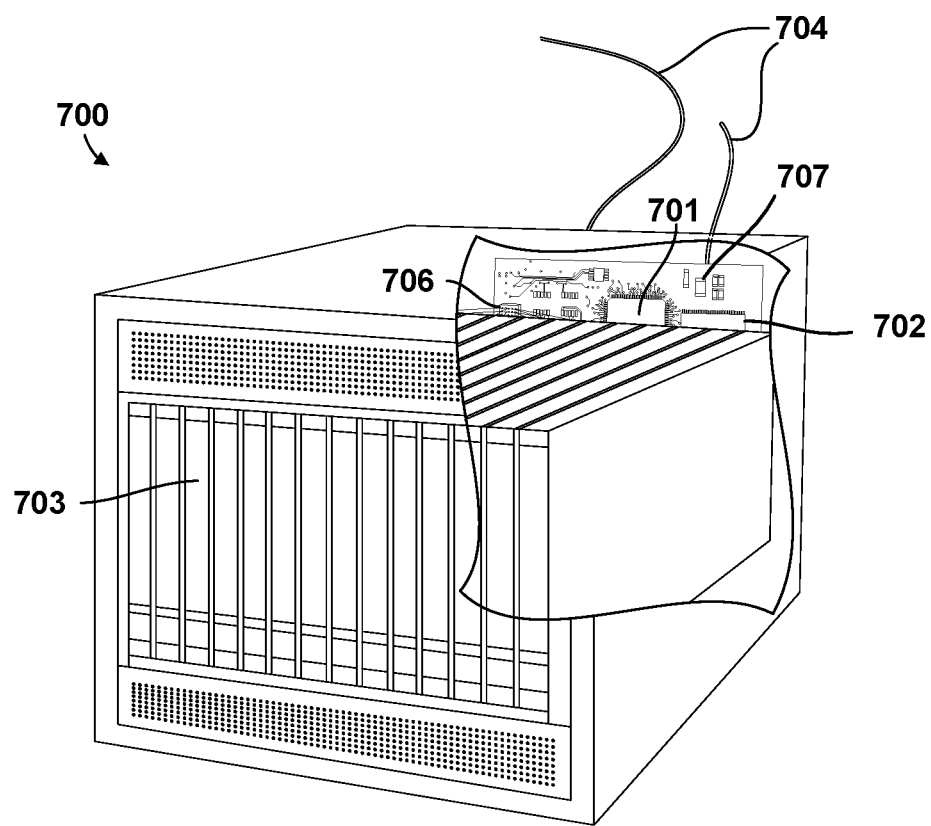
FIG. 7 is a component block diagram of a network device suitable for implementing some embodiments.

The method 600 and similar embodiments may be implemented on a variety of wireless network devices, an example of which is illustrated in FIG. 7 in the form of a wireless network computing device 700 functioning as a network element of a communication network, such as a base station. Such network computing devices may include at least the components illustrated in FIG. 7. With reference to FIGS. 1-7, the network computing device 700 may typically include a processor 701 coupled to volatile memory 702 and a large capacity nonvolatile memory, such as a disk drive 703. The network computing device 700 may also include a peripheral memory access device such as a floppy disc drive, compact disc (CD) or digital video disc (DVD) drive 706 coupled to the processor 701. The network computing device 700 may also include network access ports 704 (or interfaces) coupled to the processor 701 for establishing data connections with a network, such as the Internet and/or a local area network coupled to other system computers and servers. The network computing device 700 may include one or more antennas 707 for sending and receiving electromagnetic radiation that may be connected to a wireless communication link. The network computing device 700 may include additional access ports, such as USB, Firewire, Thunderbolt, and the like for coupling to peripherals, external memory, or other devices.

Figure 8:
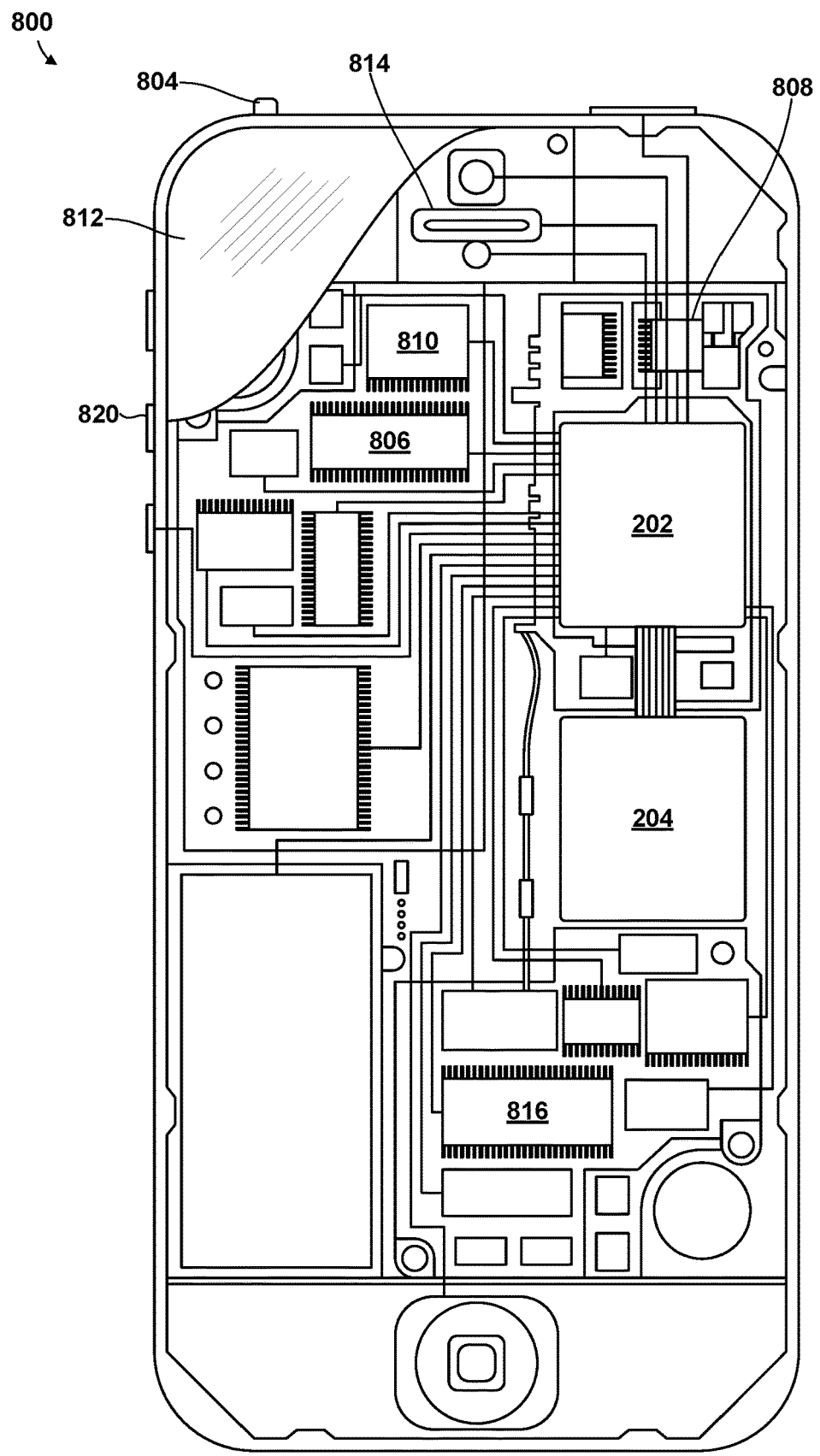
FIG. 8 is a component block diagram of a wireless communication device suitable for implementing some embodiments.

Various embodiments may be implemented on a variety of wireless devices (e.g., the wireless device 120a-120e, 200, 320), an example of which is illustrated in FIG. 8 in the form of a smartphone 800. The smartphone 800 may include a first SOC 202 (e.g., a SOC-CPU) coupled to a second SOC 204 (e.g., a 5G capable SOC). The first and second SOCs 202, 204 may be coupled to internal memory 806, 816, a display 812, and to a speaker 814. Additionally, the smartphone 800 may include an antenna 804 for sending and receiving electromagnetic radiation that may be connected to a wireless data link and/or cellular telephone transceiver 808 coupled to one or more processors in the first and/or second SOCs 202, 204. Smartphones 800 typically also include menu selection buttons or rocker switches 820 for receiving user inputs.

A typical smartphone 800 also includes a sound encoding/decoding (CODEC) circuit 810, which digitizes sound received from a microphone into data packets suitable for wireless transmission and decodes received sound data packets to generate analog signals that are provided to the speaker to generate sound. Also, one or more of the processors in the first and second SOCs 202, 204, wireless transceiver 808 and CODEC 810 may include a digital signal processor (DSP) circuit (not shown separately).

The processors of the wireless network computing device 700 and the smart phone 800 may be any programmable microprocessor, microcomputer or multiple processor chip or chips that can be configured by software instructions (applications) to perform a variety of functions, including the functions of the various embodiments described below. In some mobile devices, multiple processors may be provided, such as one processor within an SOC 204 dedicated to wireless communication functions and one processor within an SOC 202 dedicated to running other applications. Typically, software applications may be stored in the memory 806, 816 before they are accessed and loaded into the processor. The processors may include internal memory sufficient to store the application software instructions.

As used in this application, the terms "component," "module," "system," and the like are intended to include a computer-related entity, such as, but not limited to, hardware, firmware, a combination of hardware and software, software, or software in execution, which are configured to perform particular operations or functions. For example, a component may be, but is not limited to, a process running on a processor, a processor, an object, an executable, a thread of execution, a program, and/or a computer. By way of illustration, both an application running on a wireless device and the wireless device may be referred to as a component. One or more components may reside within a process and/or thread of execution and a component may be localized on one processor or core and/or distributed between two or more processors or cores. In addition, these components may execute from various non-transitory computer readable media having various instructions and/or data structures stored thereon. Components may communicate by way of local and/or remote processes, function or procedure calls, electronic signals, data packets, memory read/writes, and other known network, computer, processor, and/or process related communication methodologies.

A number of different cellular and mobile communication services and standards are available or contemplated in the future, all of which may implement and benefit from the various embodiments. Such services and standards include, e.g., third generation partnership project (3GPP), long term evolution (LTE) systems, third generation wireless mobile communication technology (3G), fourth generation wireless mobile communication technology (4G), fifth generation wireless mobile communication technology (5G), global system for mobile communications (GSM), universal mobile telecommunications system (UMTS), 3GSM, general packet radio service (GPRS), code division multiple access (CDMA) systems (e.g., cdmaOne, CDMA1020™), enhanced data rates for GSM evolution (EDGE), advanced mobile phone system (AMPS), digital AMPS (IS-136/TDMA), evolution-data optimized (EV-DO), digital enhanced cordless telecommunications (DECT), Worldwide Interoperability for Microwave Access (WiMAX), wireless local area network (WLAN), Wi-Fi Protected Access I & II (WPA, WPA2), and integrated digital enhanced network (iDEN). Each of these technologies involves, for example, the transmission and reception of voice, data, signaling, and/or content messages. It should be understood that any references to terminology and/or technical details related to an individual telecommunication standard or technology are for illustrative purposes only, and are not intended to limit the scope of the claims to a particular communication system or technology unless specifically recited in the claim language.

Various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any one example embodiment. For example, one or more of the operations of the methods 500, 600 may be substituted for or combined with one or more operations of the methods 500, 600.

The foregoing method descriptions and the process flow diagrams are provided merely as illustrative examples and are not intended to require or imply that the operations of various embodiments must be performed in the order presented. As will be appreciated by one of skill in the art the order of operations in the foregoing embodiments may be performed in any order. Words such as "thereafter," "then," "next," etc. are not intended to limit the order of the operations; these words are used to guide the reader through the description of the methods. Further, any reference to claim elements in the singular, for example, using the articles "a," "an," or "the" is not to be construed as limiting the element to the singular.

Various illustrative logical blocks, modules, components, circuits, and algorithm operations described in connection with the embodiments disclosed herein may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such embodiment decisions should not be interpreted as causing a departure from the scope of the claims.

The hardware used to implement various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of receiver smart objects, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In one or more embodiments, the functions described may be implemented in hardware, software, firmware, or any combination thereof. If implemented in software, the functions may be stored as one or more instructions or code on a non-transitory computer-readable storage medium or non-transitory processor-readable storage medium. The operations of a method or algorithm disclosed herein may be embodied in a processor-executable software module or processor-executable instructions, which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage smart objects, or any other medium that may be used to store desired program code in the form of instructions or data structures and that may be accessed by a computer. Disk and disc, as used herein, includes compact disc (CD), laser disc, optical disc, DVD, floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The preceding description of the disclosed embodiments is provided to enable any person skilled in the art to make or use the claims. Various modifications to these embodiments will be readily apparent to those skilled in the art, and the generic principles defined herein may be applied to other embodiments without departing from the scope of the claims. Thus, the present disclosure is not intended to be limited to the embodiments shown herein but is to be accorded the widest scope consistent with the following claims and the principles and novel features disclosed herein.

What is claimed is:

1. A wireless device, comprising:
a processor configured with processor-executable software instructions to:
determine a first signal measurement quantity based on a first physical layer communication and determine a second signal measurement quantity based on a second physical layer communication, wherein:
the first physical layer communication is a synchronization signal block (SSB) communication and the second physical layer communication is a channel state information reference signal (CSI-RS) communication; or
the first physical layer communication is a physical downlink control channel (PDCCH) communication and the second physical layer communication is a physical downlink shared channel (PDSCH) communication;

determine a difference between the first signal measurement quantity and the second signal measurement quantity;
determine whether the difference between the first signal measurement quantity and the second signal measurement quantity satisfies a threshold;
determine whether a jammer or non-benign entity is present in a network in response to determining that the difference between the first signal measurement quantity and the second signal measurement quantity satisfies the threshold; and
perform a mitigation operation in response to determining a jammer or non-benign entity is present in the network.

2. The wireless device of claim 1, wherein the processor is configured such that:
at least one of the first signal measurement quantity or the second signal measurement quantity is one of:
a reference signal receive power (RSRP);
a radio signal strength indicator (RSSI); or
a signal to noise ratio (SNR).

3. The wireless device of claim 1, wherein the processor is configured to:
determine the first signal measurement quantity based on the first physical layer communication by determining a reference signal receive power (RSRP) based on the SSB;
determine the second signal measurement quantity based on the second physical layer communication by determining an RSRP based on the CSI-RS; and
determine the difference between the first signal measurement quantity and the second signal measurement quantity by determining the difference between the RSRP of the SSB and the RSRP of the CSI-RS.

4. The wireless device of claim 1, wherein the processor is configured to:
determine the first signal measurement quantity based on the first physical layer communication by determining a radio signal strength indicator (RSSI) based on the PDCCH;
determine the second signal measurement quantity based on the second physical layer communication by determining an RSSI based on the PDSCH; and
determine the difference between the first signal measurement quantity and the second signal measurement quantity by determining the difference between the RSSI of the PDCCH and the RSSI of the PDSCH.

5. The wireless device of claim 1, wherein the processor is configured to perform operations further comprising:
receive from a base station a value identifying a relationship between a transmit power of the first physical layer communication and a transmit power of the second physical layer communication; and
determine the threshold based on the relationship between a transmit power of the first physical layer communication and a transmit power of the second physical layer communication.

6. The wireless device of claim 1, wherein the processor is configured to perform operations further comprising:
receive from a base station at least one Quasi Co-location (QCL) value corresponding to at least one of the first signal measurement quantity or the second signal measurement quantity; and
determine the threshold based on the received at least one QCL value.

7. A wireless device, comprising:
a processor configured with processor-executable software instructions to:
   determine a reference signal receive power (RSRP) based on a synchronization signal block (SSB);
   determine an RSRP based on a channel state information reference signal (CSI-RS);
   determine a difference between the RSRP of the SSB and the RSRP of the CSI-RS;
   determine whether the difference between the RSRP of the SSB and the RSRP of the CSI-RS satisfies a threshold;
   determine whether a jammer or non-benign entity is present in a network in response to determining that the difference between the RSRP of the SSB and the RSRP of the CSI-RS satisfies the threshold; and
   perform a mitigation operation in response to determining a jammer or non-benign entity is present in the network.

8. A wireless device, comprising:
a processor configured with processor-executable software instructions to:
   determine a radio signal strength indicator (RSSI) based on a demodulation reference signal (DMRS) associated with a physical downlink control channel (PDCCH);
   determine an RSSI based on a non-demodulation reference signal (non-DMRS) associated with the PDCCH;
   determine a difference between the RSSI of the DMRS associated with the PDCCH and the RSSI of the non-DMRS associated with the PDCCH;
   determine whether the difference between the RSSI of the DMRS associated with the PDCCH and the RSSI of the non-DMRS associated with the PDCCH satisfies a threshold;
   determine whether a jammer or non-benign entity is present in a network in response to determining that the difference between the RSSI of the DMRS associated with the PDCCH and the RSSI of the non-DMRS associated with the PDCCH satisfies the threshold; and
   perform a mitigation operation in response to determining a jammer or non-benign entity is present in the network.

9. A wireless device, comprising:
a processor configured with processor-executable software instructions to:
   determine a normalized signal to noise ratio (SNR) based on a demodulation reference signal (DMRS) associated with a physical downlink control channel (PDCCH);
   determine a normalized SNR based on a non-demodulation reference signal (non-DMRS) associated with the PDCCH;
   determine a difference between the normalized SNR of the DMRS associated with the PDCCH and the normalized SNR of the non-DMRS associated with the PDCCH;
   determine whether the difference between the normalized SNR of the DMRS associated with the PDCCH and the normalized SNR of the non-DMRS associated with the PDCCH satisfies a threshold;
   determine whether a jammer or non-benign entity is present in a network in response to determining that the difference between the normalized SNR of the DMRS associated with the PDCCH and the normalized SNR of the non-DMRS associated with the PDCCH satisfies the threshold; and
   perform a mitigation operation in response to determining a jammer or non-benign entity is present in the network.

10. A wireless device, comprising:
a processor configured with processor-executable software instructions to:
   determine a radio signal strength indicator (RSSI) based on a physical downlink control channel (PDCCH);
   determine an RSSI based on a physical downlink shared channel (PDSCH);
   determine a difference between the RSSI of the PDCCH and the RSSI of the PDSCH;
   determine whether the difference between the RSSI of the PDCCH and the RSSI of the PDSCH satisfies a threshold;
   determine whether a jammer or non-benign entity is present in a network in response to determining that the difference between the RSSI of the PDCCH and the RSSI of the PDSCH satisfies the threshold; and
   perform a mitigation operation in response to determining a jammer or non-benign entity is present in the network.

11. A wireless device, comprising:
a processor configured with processor-executable software instructions to:
   determine a radio signal strength indicator (RSSI) based on a demodulation reference signal (DMRS) associated with a physical downlink shared channel (PDSCH);
   determine an RSSI based on a non-demodulation reference signal (non-DMRS) associated with the PDSCH;
   determine a difference between the RSSI of the DMRS associated with the PDSCH and the RSSI of the non-DMRS associated with the PDSCH;
   determine whether the difference between the RSSI of the DMRS associated with the PDSCH and the RSSI of the non-DMRS associated with the PDSCH satisfies a threshold;
   determine whether a jammer or non-benign entity is present in a network in response to determining that the difference between the RSSI of the DMRS associated with the PDSCH and the RSSI of the non-DMRS associated with the PDSCH satisfies the threshold; and
   perform a mitigation operation in response to determining a jammer or non-benign entity is present in the network.

12. A wireless device, comprising:
a processor configured with processor-executable software instructions to:
   determine a normalized signal to noise ratio (SNR) based on a demodulation reference signal (DMRS) associated with a physical downlink shared channel (PDSCH);
   determine a normalized SNR based on a non-demodulation reference signal (non-DMRS) associated with the PDSCH;
   determine a difference between the normalized SNR of the DMRS associated with the PDSCH and the normalized SNR of the non-DMRS associated with the PDSCH;
   determine whether the difference between the normalized SNR of the DMRS associated with the PDSCH and the normalized SNR of the non-DMRS associated with the PDSCH satisfies a threshold;

determine whether a jammer or non-benign entity is present in a network in response to determining that the difference between the normalized SNR of the DMRS associated with the PDSCH and the normalized SNR of the non-DMRS associated with the PDSCH satisfies the threshold; and perform a mitigation operation in response to determining a jammer or non-benign entity is present in the network.

13. A wireless device, comprising:
a processor configured with processor-executable software instructions to:
   determine a first signal measurement quantity based on a first physical layer communication;
   determine a second signal measurement quantity based on a second physical layer communication;
   determine a difference between the first signal measurement quantity and the second signal measurement quantity;
   receive from a base station a value identifying a relationship between a transmit power of the first physical layer communication and a transmit power of the second physical layer communication;
   determine a threshold based on the relationship between the transmit power of the first physical layer communication and the transmit power of the second physical layer communication;
   determine whether the difference between the first signal measurement quantity and the second signal measurement quantity satisfies the threshold;
   determine whether a jammer or non-benign entity is present in a network in response to determining that the difference between the first signal measurement quantity and the second signal measurement quantity satisfies the threshold; and
   perform a mitigation operation in response to determining a jammer or non-benign entity is present in the network.

14. The wireless device of claim 13, wherein the processor is configured such that the first physical layer communication and the second physical layer communication are both:
   physical downlink control channel (PDCCH) communications;
   physical downlink shared channel (PDSCH) communications; or
   reference signal (RS) communications.

15. The wireless device of claim 13, wherein the processor is configured to:
   determine the first signal measurement quantity based on the first physical layer communication by determining a radio signal strength indicator (RSSI) based on a reference signal (RS);
   determine the second signal measurement quantity based on the second physical layer communication by determining a reference signal receive power (RSRP) based on the RS; and
   determine the difference between the first signal measurement quantity and the second signal measurement quantity by determining the difference between the RSSI of the RS and the RSRP of the RSSI.

* * * * *